US009002725B1

(12) United States Patent
Carobus et al.

(10) Patent No.: US 9,002,725 B1
(45) Date of Patent: *Apr. 7, 2015

(54) SYSTEM AND METHOD FOR TARGETING INFORMATION BASED ON MESSAGE CONTENT

(75) Inventors: Alexander Paul Carobus, Mountain View, CA (US); Niniane Wang, Mountain View, CA (US); Jared Jacobs, Palo Alto, CA (US); Keith Coleman, Mountain View, CA (US); Uma Mahadevan, Cupertino, CA (US)

(73) Assignee: Google Inc., Mountain View, CA (US)

( * ) Notice: Subject to any disclaimer, the term of this patent is extended or adjusted under 35 U.S.C. 154(b) by 918 days.

This patent is subject to a terminal disclaimer.

(21) Appl. No.: 11/215,543

(22) Filed: Aug. 29, 2005

Related U.S. Application Data

(63) Continuation-in-part of application No. 11/111,166, filed on Apr. 20, 2005.

(51) Int. Cl.
*G06Q 30/02* (2012.01)

(52) U.S. Cl.
CPC ........ *G06Q 30/0256* (2013.01); *G06Q 30/0255* (2013.01); *G06Q 30/0241* (2013.01); *G06Q 30/0251* (2013.01); *G06Q 30/0269* (2013.01); *G06Q 30/0253* (2013.01)

(58) Field of Classification Search
CPC .......... G06Q 30/0241; G06Q 30/0251; G06Q 30/0253; G06Q 30/0255; G06Q 30/0256; G06Q 30/0269
USPC ...................................................... 705/14, 1
See application file for complete search history.

(56) References Cited

U.S. PATENT DOCUMENTS 3,566,153 A 2/1971 Spencer, Jr. ................... 307/205
5,109,509 A 4/1992 Katayama et al.
(Continued)

FOREIGN PATENT DOCUMENTS

EP 0886228 A2 12/1998
JP 09-128407 A 5/1997
(Continued)

OTHER PUBLICATIONS

Comer, D. and Peterson, L., "Conversation-Based Mail," ACM Transactions on Computer Systems (TOCS) vol. 4, Issue 4, pp. 299-319, Nov. 1986.
(Continued)

*Primary Examiner* — Scott D Gartland
(74) *Attorney, Agent, or Firm* — Morgan, Lewis & Bockius LLP

(57) ABSTRACT

A method of serving an electronic document in response to a client request includes identifying an electronic document requested by a client. At least one information entity matching at least one predetermined information entity type is extracted from the electronic document. One or more links are then generated for each extracted information entity and are served to the requesting client in connection with other information corresponding to the at least one information entity and the electronic document. In some embodiments the electronic document is an email message, SMS message, transcribed voice message, or a combination of such messages. In some embodiments the extracted information entity is a physical address, an email address, a phone number, an object identification number, a product name, a company name, a stock symbol, a movie title, a book title, a calendar entry, an individual's name, a city name, a URL, or event information.

30 Claims, 19 Drawing Sheets

(56) References Cited

U.S. PATENT DOCUMENTS

| | | | |
|---|---|---|---|
| 5,208,748 A | 5/1993 | Flores et al. ............... 704/1 |
| 5,216,603 A | 6/1993 | Flores et al. ............... 704/1 |
| 5,613,108 A | 3/1997 | Morikawa ............... 393/616 |
| 5,724,521 A | 3/1998 | Dedrick ............... 395/226 |
| 5,724,571 A | 3/1998 | Woods |
| 5,734,837 A | 3/1998 | Flores et al. ............... 705/7 |
| 5,740,549 A | 4/1998 | Reilly et al. ............... 705/14 |
| 5,761,689 A | 6/1998 | Rayson et al. |
| 5,832,502 A | 11/1998 | Durham et al. |
| 5,848,397 A | 12/1998 | Marsh et al. ............... 705/14 |
| 5,887,133 A | 3/1999 | Brown et al. ............... 395/200.3 |
| 5,905,863 A | 5/1999 | Knowles et al. |
| 5,913,040 A | 6/1999 | Rakavy et al. |
| 5,918,014 A | 6/1999 | Robinson ............... 395/200.49 |
| 5,948,058 A | 9/1999 | Kudoh et al. ............... 709/206 |
| 5,948,061 A | 9/1999 | Merriman ............... 709/219 |
| 5,959,621 A | 9/1999 | Nawaz et al. |
| 5,963,205 A | 10/1999 | Sotomayor |
| 5,987,454 A * | 11/1999 | Hobbs ............... 707/4 |
| 6,014,502 A | 1/2000 | Moraes ............... 395/200.49 |
| 6,021,427 A | 2/2000 | Spagna et al. |
| 6,026,368 A | 2/2000 | Brown et al. ............... 705/14 |
| 6,029,164 A | 2/2000 | Birrell et al. |
| 6,044,376 A | 3/2000 | Kurtzman, II ............... 707/102 |
| 6,078,914 A | 6/2000 | Redfern ............... 707/3 |
| 6,085,206 A | 7/2000 | Domini et al. |
| 6,115,709 A | 9/2000 | Gilmour et al. ............... 707/9 |
| 6,134,532 A * | 10/2000 | Lazarus et al. ............... 705/14 |
| 6,144,944 A | 11/2000 | Kurtzman, II et al. ............... 705/14 |
| 6,148,332 A | 11/2000 | Brewer et al. ............... 709/218 |
| 6,151,596 A | 11/2000 | Hosomi |
| 6,167,382 A | 12/2000 | Sparks et al. ............... 705/26 |
| 6,182,063 B1 | 1/2001 | Woods |
| 6,182,098 B1 | 1/2001 | Selker |
| 6,182,122 B1 | 1/2001 | Berstis |
| 6,185,551 B1 | 2/2001 | Birrell et al. ............... 707/3 |
| 6,269,361 B1 | 7/2001 | Davis et al. ............... 707/3 |
| 6,330,589 B1 | 12/2001 | Kennedy |
| 6,332,127 B1 | 12/2001 | Bandera et al. ............... 705/14 |
| 6,350,066 B1 | 2/2002 | Bobo, II |
| 6,356,834 B2 | 3/2002 | Hancock et al. ............... 701/200 |
| 6,381,465 B1 | 4/2002 | Chern et al. ............... 455/466 |
| 6,396,513 B1 | 5/2002 | Helfman et al. |
| 6,401,075 B1 | 6/2002 | Mason et al. ............... 705/14 |
| 6,408,297 B1 | 6/2002 | Ohashi |
| 6,421,694 B1 | 7/2002 | Nawaz et al. |
| 6,438,564 B1 | 8/2002 | Morton et al. |
| 6,449,657 B2 | 9/2002 | Stanbach, Jr. et al. ............... 709/245 |
| 6,493,702 B1 | 12/2002 | Adar et al. |
| 6,493,703 B1 | 12/2002 | Knight et al. |
| 6,505,046 B1 | 1/2003 | Baker ............... 455/456 |
| 6,507,351 B1 | 1/2003 | Bixler |
| 6,522,875 B1 | 2/2003 | Dowling et al. ............... 455/414 |
| 6,549,957 B1 | 4/2003 | Hanson et al. |
| 6,571,279 B1 | 5/2003 | Herz et al. ............... 709/217 |
| 6,587,835 B1 | 7/2003 | Treyz et al. ............... 705/14 |
| 6,594,658 B2 | 7/2003 | Woods |
| 6,594,693 B1 | 7/2003 | Borwankar |
| 6,606,644 B1 | 8/2003 | Ford et al. ............... 709/203 |
| 6,640,239 B1 | 10/2003 | Gidwani |
| 6,654,735 B1 * | 11/2003 | Eichstaedt et al. ............... 707/749 |
| 6,665,668 B1 | 12/2003 | Sugaya et al. |
| 6,683,627 B1 | 1/2004 | Ullmann et al. |
| 6,708,205 B2 | 3/2004 | Sheldon et al. |
| 6,714,975 B1 | 3/2004 | Aggarwal et al. |
| 6,725,228 B1 | 4/2004 | Clark et al. |
| 6,732,152 B2 | 5/2004 | Lockhart et al. ............... 709/206 |
| 6,742,042 B1 | 5/2004 | Holden et al. |
| 6,745,197 B2 | 6/2004 | McDonald |
| 6,757,740 B1 | 6/2004 | Parekh et al. ............... 709/245 |
| 6,757,889 B1 | 6/2004 | Ito |
| 6,771,291 B1 | 8/2004 | DiStefano, III |
| 6,785,869 B1 | 8/2004 | Berstis |
| 6,788,769 B1 | 9/2004 | Waites ............... 379/93.24 |
| 6,820,081 B1 | 11/2004 | Kawai et al. |
| 6,834,276 B1 | 12/2004 | Jensen et al. |
| 6,847,969 B1 | 1/2005 | Mathai et al. ............... 707/100 |
| 6,847,992 B1 | 1/2005 | Haitsuka et al. ............... 709/218 |
| 6,889,361 B1 | 5/2005 | Bates et al. |
| 6,892,196 B1 | 5/2005 | Hughes |
| 6,947,396 B1 | 9/2005 | Salmi ............... 370/310 |
| 6,973,481 B2 | 12/2005 | MacIntosh et al. |
| 6,983,139 B2 | 1/2006 | Dowling et al. ............... 455/414.2 |
| 6,983,311 B1 | 1/2006 | Haitsuka et al. ............... 709/217 |
| 6,985,882 B1 | 1/2006 | Del Sesto ............... 705/37 |
| 6,993,553 B2 | 1/2006 | Kaneko et al. ............... 709/201 |
| 6,999,941 B1 | 2/2006 | Agarwal |
| 7,013,263 B1 | 3/2006 | Isaka et al. |
| 7,017,173 B1 | 3/2006 | Armstrong et al. |
| 7,031,961 B2 | 4/2006 | Pitkow et al. |
| 7,035,903 B1 | 4/2006 | Baldonado |
| 7,039,599 B2 | 5/2006 | Merriman ............... 705/14 |
| 7,043,690 B1 | 5/2006 | Bates et al. |
| 7,062,572 B1 | 6/2006 | Hampton ............... 709/245 |
| 7,069,300 B2 | 6/2006 | Toyota et al. |
| 7,089,278 B1 | 8/2006 | Churchill et al. |
| 7,107,544 B1 | 9/2006 | Luke |
| 7,120,668 B2 | 10/2006 | Manber et al. |
| 7,136,875 B2 | 11/2006 | Anderson et al. ............... 707/104.1 |
| 7,136,915 B2 | 11/2006 | Rieger, III ............... 709/223 |
| 7,139,850 B2 | 11/2006 | Amemiya et al. |
| 7,143,135 B2 | 11/2006 | Smith et al. |
| 7,171,429 B2 | 1/2007 | Frieden et al. |
| 7,188,356 B1 | 3/2007 | Miura et al. ............... 725/46 |
| 7,203,727 B2 | 4/2007 | Suzuki et al. ............... 709/206 |
| 7,215,947 B2 | 5/2007 | Bowling et al. |
| 7,243,080 B2 * | 7/2007 | Bhadra ............... 705/28 |
| 7,328,242 B1 | 2/2008 | McCarthy et al. |
| 7,356,772 B2 | 4/2008 | Brownholtz et al. |
| 7,359,936 B2 | 4/2008 | Gruen et al. |
| 7,376,714 B1 | 5/2008 | Gerken ............... 709/219 |
| 7,383,307 B2 | 6/2008 | Kirkland et al. |
| 7,412,437 B2 | 8/2008 | Moody et al. |
| 7,421,690 B2 | 9/2008 | Forstall et al. |
| 7,433,920 B2 | 10/2008 | Blagsvedt et al. |
| 7,478,414 B1 | 1/2009 | Glusker et al. |
| 7,484,175 B2 | 1/2009 | Kirkland |
| 7,487,112 B2 | 2/2009 | Barnes, Jr. ............... 705/26 |
| 7,532,890 B2 | 5/2009 | Davies et al. |
| 7,565,534 B2 | 7/2009 | Starbuck et al. |
| 7,584,208 B2 | 9/2009 | Spivack et al. |
| 7,584,251 B2 | 9/2009 | Brown et al. ............... 709/206 |
| 7,599,852 B2 | 10/2009 | Bosarge et al. |
| 7,643,352 B2 | 1/2010 | Chen |
| 7,668,832 B2 | 2/2010 | Yeh et al. ............... 707/10 |
| 7,693,866 B1 | 4/2010 | Weaver et al. |
| 7,707,283 B2 | 4/2010 | Tsunoda et al. |
| 7,716,593 B2 | 5/2010 | Durazo et al. |
| 7,730,113 B1 | 6/2010 | Payette et al. |
| 7,788,326 B2 | 8/2010 | Buchheit et al. |
| 7,827,055 B1 | 11/2010 | Snodgrass et al. |
| 7,903,099 B2 | 3/2011 | Baluja |
| 7,904,510 B2 | 3/2011 | Anderson et al. |
| 7,912,904 B2 | 3/2011 | Buchheit et al. |
| 7,949,714 B1 | 5/2011 | Burnim |
| 7,953,741 B2 | 5/2011 | Shih et al. |
| 8,554,852 B2 | 10/2013 | Burnim |
| 8,850,365 B2 | 9/2014 | Cumming |
| 2001/0016845 A1 | 8/2001 | Tribbensee |
| 2001/0042100 A1 | 11/2001 | Guedalia et al. |
| 2001/0047272 A1 | 11/2001 | Frietas et al. |
| 2001/0047294 A1 | 11/2001 | Rothschild |
| 2001/0054066 A1 | 12/2001 | Spitzer ............... 709/203 |
| 2002/0010775 A1 | 1/2002 | Rakavy et al. |
| 2002/0010794 A1 | 1/2002 | Stanbach, Jr. et al. ............... 709/245 |
| 2002/0032771 A1 | 3/2002 | Gledge ............... 709/224 |
| 2002/0046099 A1 | 4/2002 | Frengut et al. ............... 705/14 |
| 2002/0052925 A1 | 5/2002 | Kim et al. ............... 709/217 |
| 2002/0073156 A1 | 6/2002 | Newman |
| 2002/0078158 A1 | 6/2002 | Brown et al. ............... 709/206 |
| 2002/0083140 A1 | 6/2002 | Shin et al. |
| 2002/0087631 A1 | 7/2002 | Sharma ............... 709/203 |
| 2002/0094868 A1 | 7/2002 | Tuck et al. ............... 463/42 |
| 2002/0107735 A1 | 8/2002 | Henkin et al. ............... 705/14 |

(56) References Cited

U.S. PATENT DOCUMENTS

| | | |
|---|---|---|
| 2002/0116494 A1 | 8/2002 | Kocol .......................... 709/224 |
| 2002/0165923 A1 | 11/2002 | Prince .......................... 709/206 |
| 2002/0178225 A1 | 11/2002 | Madenberg et al. |
| 2002/0188689 A1 | 12/2002 | Michael ........................ 709/206 |
| 2002/0188699 A1 | 12/2002 | Ullman et al. ................ 709/219 |
| 2002/0194229 A1 | 12/2002 | Decime et al. |
| 2003/0009385 A1 | 1/2003 | Tucciarone et al. |
| 2003/0020749 A1 | 1/2003 | Abu-Hakima et al. |
| 2003/0037140 A1 | 2/2003 | Aaltonen ...................... 709/225 |
| 2003/0050916 A1 | 3/2003 | Ortega et al. ................... 707/1 |
| 2003/0055711 A1 | 3/2003 | Doherty |
| 2003/0069029 A1 | 4/2003 | Dowling et al. .............. 455/456 |
| 2003/0088554 A1 | 5/2003 | Ryan et al. ......................... 707/3 |
| 2003/0093315 A1 | 5/2003 | Sato |
| 2003/0101065 A1 | 5/2003 | Rohall et al. |
| 2003/0110227 A1 | 6/2003 | O'Hagan |
| 2003/0135555 A1 | 7/2003 | Birrel et al. |
| 2003/0145285 A1 | 7/2003 | Miyahira et al. |
| 2003/0163537 A1 | 8/2003 | Rohall et al. |
| 2003/0167310 A1 | 9/2003 | Moody et al. |
| 2003/0177190 A1 | 9/2003 | Moody et al. |
| 2003/0191689 A1* | 10/2003 | Bosarge et al. ................ 705/14 |
| 2003/0195801 A1 | 10/2003 | Takakura et al. |
| 2003/0229607 A1 | 12/2003 | Zellweger et al. |
| 2003/0233419 A1* | 12/2003 | Beringer ...................... 709/206 |
| 2004/0044735 A1 | 3/2004 | Hoblit |
| 2004/0048604 A1 | 3/2004 | Idei |
| 2004/0054737 A1 | 3/2004 | Daniell |
| 2004/0059712 A1 | 3/2004 | Dean et al. ......................... 707/1 |
| 2004/0068435 A1 | 4/2004 | Braunzell ....................... 705/14 |
| 2004/0078432 A1 | 4/2004 | Manber et al. |
| 2004/0083133 A1 | 4/2004 | Nicholas et al. ................ 705/14 |
| 2004/0083265 A1 | 4/2004 | Beringer |
| 2004/0093327 A1 | 5/2004 | Anderson et al. |
| 2004/0098488 A1 | 5/2004 | Mayers |
| 2004/0133564 A1 | 7/2004 | Gross et al. |
| 2004/0153509 A1 | 8/2004 | Alcorn et al. |
| 2004/0181580 A1 | 9/2004 | Baranshamaje .............. 709/206 |
| 2004/0199589 A1 | 10/2004 | Keohane et al. |
| 2004/0199623 A1 | 10/2004 | Houri ........................... 709/223 |
| 2004/0205141 A1 | 10/2004 | Goland |
| 2004/0210587 A1 | 10/2004 | Reysa |
| 2004/0260710 A1 | 12/2004 | Marston et al. |
| 2004/0260756 A1 | 12/2004 | Forstall et al. |
| 2004/0267700 A1 | 12/2004 | Dumais et al. |
| 2005/0004990 A1 | 1/2005 | Durazo et al. |
| 2005/0015394 A1 | 1/2005 | McKeeth ...................... 707/100 |
| 2005/0033657 A1 | 2/2005 | Herrington et al. ............ 705/26 |
| 2005/0038861 A1* | 2/2005 | Lynn et al. .................... 709/206 |
| 2005/0050027 A1 | 3/2005 | Yeh et al. |
| 2005/0060310 A1 | 3/2005 | Tong et al. ......................... 707/7 |
| 2005/0060643 A1 | 3/2005 | Glass et al. |
| 2005/0076051 A1 | 4/2005 | Carobus et al. ................ 707/102 |
| 2005/0076132 A1 | 4/2005 | Roberts et al. ................. 709/228 |
| 2005/0086598 A1 | 4/2005 | Marshall, III et al. |
| 2005/0091320 A1 | 4/2005 | Kirsch et al. |
| 2005/0102292 A1 | 5/2005 | Tamayo et al. |
| 2005/0108345 A1 | 5/2005 | Suzuki |
| 2005/0114781 A1 | 5/2005 | Brownholtz et al. |
| 2005/0130685 A1 | 6/2005 | Jenkin |
| 2005/0131715 A1* | 6/2005 | Trethewey ...................... 705/1 |
| 2005/0131884 A1 | 6/2005 | Gross et al. ......................... 707/3 |
| 2005/0137939 A1 | 6/2005 | Calabria et al. ................ 705/26 |
| 2005/0138002 A1 | 6/2005 | Giacobbe et al. |
| 2005/0144157 A1 | 6/2005 | Moody et al. |
| 2005/0144241 A1 | 6/2005 | Stata et al. |
| 2005/0149397 A1 | 7/2005 | Morgenstern et al. .......... 705/14 |
| 2005/0160107 A1 | 7/2005 | Liang |
| 2005/0165896 A1 | 7/2005 | Mooney ........................ 709/206 |
| 2005/0177401 A1 | 8/2005 | Koeppel et al. ................... 705/4 |
| 2005/0182765 A1 | 8/2005 | Liddy |
| 2005/0187823 A1 | 8/2005 | Howes ............................ 705/14 |
| 2005/0198173 A1 | 9/2005 | Evans |
| 2005/0198256 A1 | 9/2005 | Moody et al. |
| 2005/0216454 A1 | 9/2005 | Diab et al. ......................... 707/3 |
| 2005/0216516 A1 | 9/2005 | Calistri-Yeh et al. |
| 2005/0222900 A1 | 10/2005 | Fuloria et al. ................... 705/14 |
| 2005/0223058 A1 | 10/2005 | Buchheit et al. |
| 2005/0223066 A1 | 10/2005 | Buchheit et al. |
| 2006/0020510 A1 | 1/2006 | Vest ............................... 705/14 |
| 2006/0026046 A1 | 2/2006 | Yaron et al. ....................... 705/7 |
| 2006/0026593 A1 | 2/2006 | Canning et al. |
| 2006/0031304 A1 | 2/2006 | Bagga et al. |
| 2006/0064346 A1 | 3/2006 | Steenstra et al. |
| 2006/0075445 A1 | 4/2006 | O'Kane ........................ 725/100 |
| 2006/0080303 A1 | 4/2006 | Sargent et al. .................... 707/3 |
| 2006/0085434 A1 | 4/2006 | Mah et al. ..................... 707/100 |
| 2006/0092920 A1 | 5/2006 | Karamchedu et al. |
| 2006/0123091 A1 | 6/2006 | Ho |
| 2006/0129455 A1 | 6/2006 | Shah |
| 2006/0129943 A1 | 6/2006 | Maguire |
| 2006/0149677 A1 | 7/2006 | Shahine et al. |
| 2006/0167747 A1 | 7/2006 | Goodman et al. ............. 705/14 |
| 2006/0179127 A1 | 8/2006 | Randall ........................ 709/219 |
| 2006/0184617 A1 | 8/2006 | Nicholas et al. .............. 709/203 |
| 2006/0224750 A1 | 10/2006 | Davies et al. |
| 2006/0248209 A1 | 11/2006 | Chiu et al. |
| 2006/0259473 A1 | 11/2006 | Li et al. |
| 2006/0294084 A1 | 12/2006 | Patel et al. ......................... 707/3 |
| 2007/0005715 A1 | 1/2007 | LeVasseur et al. |
| 2007/0033531 A1 | 2/2007 | Marsh ........................... 715/738 |
| 2007/0047697 A1 | 3/2007 | Drewry et al. |
| 2007/0050372 A1 | 3/2007 | Boyle ............................ 707/10 |
| 2007/0067404 A1 | 3/2007 | Brown et al. |
| 2007/0088801 A1 | 4/2007 | Levkovitz et al. |
| 2007/0088851 A1 | 4/2007 | Levkovitz et al. |
| 2007/0088852 A1 | 4/2007 | Levkovitz et al. |
| 2007/0143411 A1 | 6/2007 | Costea et al. |
| 2007/0143428 A1 | 6/2007 | Kumar et al. |
| 2007/0157119 A1 | 7/2007 | Bishop |
| 2007/0198639 A1 | 8/2007 | Litwin et al. |
| 2007/0255791 A1 | 11/2007 | Bodlaender et al. |
| 2007/0294740 A1 | 12/2007 | Drake et al. .................. 725/131 |
| 2008/0147815 A1 | 6/2008 | Damm et al. |
| 2008/0275873 A1 | 11/2008 | Bosarge et al. |
| 2008/0294524 A1 | 11/2008 | Badros et al. |
| 2008/0313292 A1 | 12/2008 | Forstall et al. |
| 2009/0018917 A1 | 1/2009 | Chapman et al. |
| 2010/0280903 A1 | 11/2010 | Barlin et al. |
| 2010/0299326 A1 | 11/2010 | Germaise |
| 2011/0264750 A1 | 10/2011 | Fabre et al. |
| 2012/0226760 A1 | 9/2012 | Lewis |

FOREIGN PATENT DOCUMENTS

| | | | |
|---|---|---|---|
| JP | 2001-222477 | 8/2001 | |
| JP | 2002-359667 A | 12/2002 | |
| JP | 2003-030216 A | 1/2003 | |
| JP | 2003-108278 A | 4/2003 | |
| WO | WO 97/21183 | 6/1997 | |
| WO | WO 00/23931 | 4/2000 | |
| WO | WO 00/54201 | 9/2000 | ............. G06F 17/60 |
| WO | WO 01/61551 A1 | 8/2001 | |
| WO | WO 01/63512 A1 | 8/2001 | |
| WO | WO 03/058519 A2 | 7/2003 | |
| WO | WO 03/067497 | 8/2003 | |

OTHER PUBLICATIONS

Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderdale, Florida.

Bellotti, V. et al., "Taskmaster: recasting email as task management," PARC, CSCW '02 Workshop on Redesigning Email for the 21st Century.

Flores, F. et al., "Computer Systems and the design of organizational interaction," ACM Transactions on Information Systems., pp. 153-172, (1988).

Shepherd, A. et al., "Strudel—an extensible electronic conversation toolkit," Proceedings of the 1990 ACM Conference on Computer-supported Cooperative Work, Los Angeles, California, United States, pp. 93-104.

(56) References Cited

OTHER PUBLICATIONS

Venolia, G., et al., "Supporting Email Workflow,"Technical Report MSR-TR-2001-88, Microsoft Corporation, 10 pages (Sep. 2001).
Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.
Winograd, T., "Where the Action is," pp. 256A-260, Byte, Dec. 1988.
Zawinski, J., "Message Threading," http://www.jwz.org/doc/threading.html, pp. 1-9 (1997-2000).
Friedman, N., "Dashboard," Ximian Inc., Jul. 25, 2003.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
U.S. Appl. No. 95/001,073, Reexamination of Stone et al.
U.S. Appl. No. 95/001,061, Reexamination of Stone et al.
U.S. Appl. No. 95/001,069, Reexamination of Dean et al.
U.S. Appl. No. 95/001,068, Reexamination of Stone et al.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., *Advertising on the Internet*, 2$^{nd}$ Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Digital Envoy Press Releases, "Double click and Digital Envoy Partner to Offer Advanced Geo-Targeting Solutions," Mar. 23, 2003, 2 pages.
NetGravity AdServer AdMaster's Guide, Mar. 11, 1997, 59 pages.
About Microsoft Word Screen Shot, May 28, 2007, 1 pg.
AdSense, http://web.archive.org/web/20050112192021/https://www.google.com/adsense/afc-online-overview, Jan. 12, 2005, 3 pgs.
Apple Computer Inc., Mail 1.3.3 Help: Checking Spelling in Email, Aug. 31, 2004, 1 pg.
Apple Computer Inc., Mac Mail Utility Screenshot, Aug. 18, 2004, 1 pg.
Courter, Mastering Microsoft Office 2000—Professional Edition, (no date) p. 5.
Courter, Mastering Microfost Office 2000—Professional Edition, (no date) pp. 36-37 and 92-94.
Givens, Privacy Rights Clearinghouse letter: An Open Letter to Google Regarding its Proposed Gmail Service, Apr. 6, 2004, www.privacyrights.org/ar/GmailLetter.htm, 4 pgs.
Gmail beta About Gmail, Apr. 20, 2004, 2 pgs.
Gmail beta Sneak Peek of Conversation View, Apr. 20, 2004, 1 pg.
Gmail beta Sneak Peek of Gmail Inbox, Apr. 20, 2004, 1 pg.
Google search results page for outlook 2003 conversation view, downloaded Nov. 7, 2013, 2 pgs.
Google. European Search Report, EP 11172427.4, Dec. 21, 2011, 6 pgs.
Google, International Preliminary Report on Patentability, PCT/US2005/006826, Oct. 4, 2006, 4 pgs.
Google, International Search Report/Written Opinion, PCT/US2005/006826, Jun. 26, 2006, 7 pgs.
Google, International Search Report/Written Opinion, PCT/US2005/010137, Jun. 3, 2005, 3 pgs.
Google, Notice of Acceptance, Australian Patent Application No. 2011203058, Jan. 6, 2012, 3 pgs.
Google, Office Action, Australian Patent Application No. 2011201989, Apr. 12, 2012, 3 pgs.
Google, Office Action, Australian Patent Application No. 2011201991, Mar. 8, 2012, 2 pgs.
Google, Office Action, Australian Patent Application No. 2011201992, Aug. 16, 2012, 3 pgs.
Google, Office Action, Australian Patent Application No. 2011201993, Feb. 28, 2012, 2 pgs.
Google, Office Action, Australian Patent Application No. 2011201994, Mar. 8, 2012, 2 pgs.
Google, Office Action, Australian Patent Application No. 2011203058, Oct. 31, 2011, 1 pg.
Google, Office Action, Chinese Patent Application No. 200580016413.8, Jul. 2, 2012, 3 pgs.
Google, Office Action, Chinese Patent Application No. 200580016413.8, Dec. 19, 2011, 3 pgs.
Google, Office Action, JP 2010-275595, Jul. 6, 2012, 4 pgs.
Google, Office Action, Korean Patent Application No. 2006-7022840, Jan. 26, 2012, 4 pgs.
Google, Office Action, KR 2011-7017094, Sep. 26, 2011, 5 pgs.
Google, Office Action, KR 2011-7017095, Sep. 29, 2011, 5 pgs.
Google, Office Action, KR 2011-7017096, Oct. 4, 2011, 4 pgs.
Google, Office Action, KR 2011-7017098, Oct. 4, 2011, 3 pgs.
Google, Office Action, KR 2011-7017102, Oct. 4, 2011, 4 pgs.
Google, Supplemental European Search Report, EP 05724384.2, Mar. 16, 2009, 5 pgs.
Gorman, The Next Major Email Domain: Gmail.com, Jun. 2004, 1 pg.
Jackman, Use these five tips to help control how Outlook 2003 displays e-mail, Sep. 22, 2004, 11 pgs.
Lawrence, Context and Page Analysis for Improved Web Search, Oct. 31, 1998, 9 pgs.
News from Google, Google Gets the Message, Launches Gmail, Apr. 1, 2004, http://googlepress.blogspot.com/2004/04/google-gets-message-launches-gmail.html, downloaded Nov. 9, 2012, 2 pgs.
O'Hara, Easy Microsoft Office Outlook 2003, Sep. 18, 2003, 44 pgs.
O'Reilly, The Fuss About Gmail and Privacy: Nine Reasons Why It's Bogus, Apr. 16, 2004, http://oreilly.com/lpt/wlg/4707, 4 pgs.
Resnick, Network Working Group, RFC 2822, Apr. 2011, 70 pgs.
Russel, Special Edition Using Microsoft Office Outlook 2003, Sep. 25, 2003, 102 pgs.
Screenshot of Reply to Message in Lotus Notes 6.5, Aug. 6, 2007, 1 pg.
Syroid, Outlook 2000 in a Nutshell, May 2, 2000, O'Reilly, 1-66 pgs.
Thies, Special Report: How to Prosper With the New Google, 2004, 17 pgs.
Tobias, Dan's Mail Format Site, Feb. 2, 2009, 6 pgs.
Tyson, Sam's Teach Yourself Microsoft Outlook 2000 in 24 Hours, 1999, 2 pgs.
View messages by conversation or thread, anonymous, downloaded Nov. 6, 2013, http://office.microsoft.com/en-us/outlook-help/view-messages-by-conversation-or-thread-HA001135667.aspx, 2 pgs.

\* cited by examiner

Add or Update Contact

Name: John Doe

Primary Email: johndoe@domain.com

Notes: 1600 Amphitheatre Parkway
Mountain View, CA 94043 — 1350

Save | Cancel add more contact info

Figure 13C

Itinerary Inbox cob_test titn

☆ unam

Reply - More options  Aug 24 (1 day ago)      🖨 Print
                                                🗗 New window
DATE: NOV 08 2000

SERVICE    DATE    FROM    TO    DEPART  ARRIVE       Would you like to...

CONTINENTAL AIRLINES 01DEC HOUSTON TX   NEW YORK NY  115P  547P    ┌─────────────────────┐
CO 1970  Q     FRI G.BUSH INTERCO LA GUARDIA                       │ Add trip to calendar │──1410
              TERMINAL C    TERMINAL M                             └─────────────────────┘
              SNACK         NON STOP    3:32 DURATION              ┌─────────────────────┐
              RESERVATION CONFIRMED                                │ Get weather forecast for │──1420
       AIRCRAFT: BOEING 737-300                                    │ Cleveland           │
              SEAT 16C NO SMOKING CONFIRMED    1440                └─────────────────────┘
                                                                   ┌─────────────────────┐
CONTINENTAL AIRLINES 03DEC NEW YORK NY  ┌CLEVELAND OH┐ 120P  259P  │ Search for hotels in │──1430
CO 1905  Q     SUN  LA GUARDIA  HOPKINS INT                        │ Cleveland           │
              TERMINAL M                                           └─────────────────────┘
              NON STOP
              RESERVATION CONFIRMED    1:39 DURATION
       AIRCRAFT: BOEING 737-300
              SEAT 21A NO SMOKING CONFIRMED CONTINENTAL AIRLINES 03DEC CLEVELAND OH HOUSTON TX   405P  605P
CO 1999  Q     SUN  HOPKINS INT  G.BUSH INTERCO
                                 TERMINAL C
              SNACK          NON STOP
              RESERVATION CONFIRMED     3:00 DURATION
       AIRCRAFT: MCDONNELL DOUGLAS ALL MD-80 SERIES
              SEAT 27D NO SMOKING CONFIRMED
       THIS IS A NON-REFUNDABLE FARE THAT REQUIRES
       TRAVEL ON THESE SPECIFIC DATES AND FLIGHTS.
       ANY CHANGES WILL RESULT IN A PENALTY AND/OR
              ADDITIONAL COLLECTION.
*********************************************

YOUR TICKET REFLECTS A NEGOTIATED DISCOUNT FROM THE TAP
   THE PUBLISHED FARE FOR THIS TICKET IS $206.00
*********************************************

Security Update  Inbox cob test

☆ Uma
                                                 Reply · More options  12:16 pm (0 minutes ago)

🖨 Print
🗗 New window

Would you like to...
   Get prices
🐘 MS Access
   About these links

1510

In our continuing effort to provide security and stability to the revenue-producing systems here at EES, we would like to ask for your assistance with a few items. In general, we want to ensure that all business critical systems are clear from the risk of downtime, which could negatively impact the business.

So, what does this mean to you?  We need to make sure that any computer programs and files you use to do your job are protected and reside in an environment that is controlled by the IT infrastructure group.  This serves several purposes, including:

Ensuring that everything business critical is backed up properly and can be recovered if a workstation's hard drive fails.
Ensuring that specialized programs like Cobra or BSOC or RPS or RGS which are business critical can easily be installed on any workstation by the IT group.  This will help keep the business up and running if you have to switch workstations suddenly.

Files: Spreadsheets, Excel macros, MS Access databases, and the like - Please make sure that any spreadsheets or MS Access databases you use for the business are not stored on your local computer drives.  These files should be stored on a network-shared drive (in general, something other than C or D drive).  That way, if that elephant comes back another night, we could get you another workstation from which to operate without losing any of your valuable work.

Reply  Forward

SYSTEM AND METHOD FOR TARGETING INFORMATION BASED ON MESSAGE CONTENT

RELATED APPLICATIONS

This application is a continuation-in-part (CIP) of U.S. patent application Ser. No. 11/111,166, filed Apr. 20, 2005, entitled "System and Method for Targeting Information Based on Message Content" which is incorporated by reference herein in its entirety.

TECHNICAL FIELD

The disclosed embodiments relate generally to providing information to computer users.

BACKGROUND

An electronic document, be it a web page or an email message, often contains references to specific information entities in the real world, such as a phone number, an address, a product name or a movie title. While viewing the document, a reader may desire to learn more information with respect to a particular information entity and then decide the next move. For example, while reading an email message including a title of a newly released movie, the reader may prefer to have quick and easy access to reviews about the movie and even the movie's schedule at a nearby movie theater in case he or she decides to watch the movie. Therefore, it is desirable to have a system and method that automatically retrieves information related to an information entity identified in a document in advance and selectively displays some of the information when rendering the document.

SUMMARY

According to some embodiments, a method of serving an electronic document in response to a client request includes identifying an electronic document requested by a client. At least one information entity matching at least one predetermined information entity type is extracted from the electronic document. One or more links are then generated for each extracted information entity and are served to the requesting client in connection with other information corresponding to the at least one information entity and the electronic document.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

FIGS. 13A-13C are exemplary screenshots of an email message including an address as well as links associated with the address and information corresponding to the address in accordance with some embodiments of the present invention.

FIGS. 14A-14D are exemplary screenshots of an itinerary message including a city name as well as links associated with the city name and information corresponding to the city name in accordance with some embodiments of the present invention.

FIGS. 15A-15B are exemplary screenshots of an email message including a product name as well as links associated with the product name and information corresponding to the product name in accordance with some embodiments of the present invention.

DESCRIPTION OF EMBODIMENTS

Figure 1:
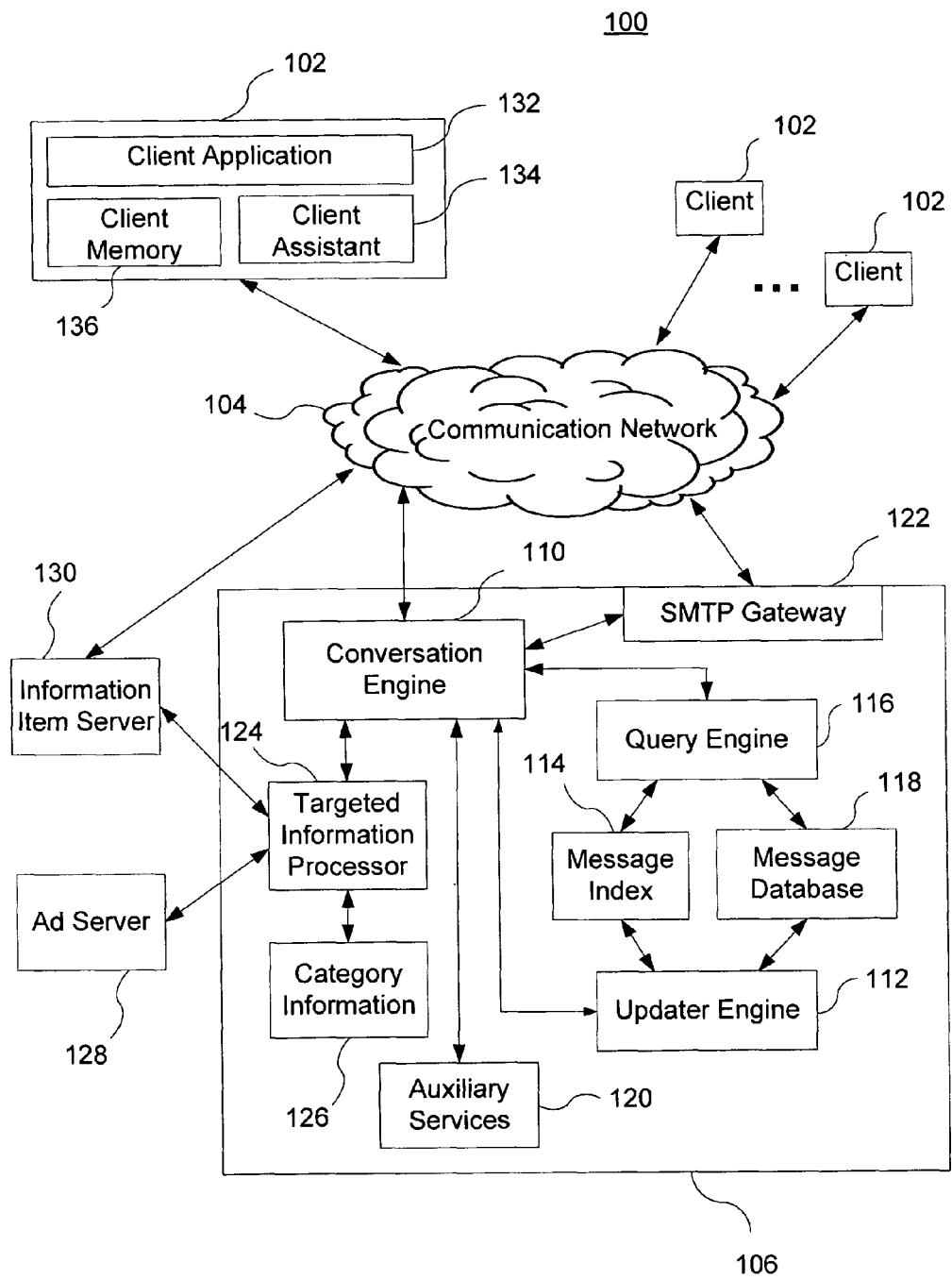
FIG. 1 is a block diagram of an exemplary environment that generates targeted information based on message content in accordance with some embodiments of the present invention.

FIG. 1 is a block diagram of a system 100 for implementing some embodiments of the invention. One or more clients 102 can be connected to a communication network 104. The communication network 104 can be connected to an information service 106. The information service 106 can include a conversation engine 110, an updater engine 112, a message index 114, a query engine 116, a message database 118, one or more auxiliary services servers 120, an SMTP gateway 122, a targeted information processor 124, category information 126. The targeted information processor 124 can be connected to an ad server 128 and one or more information item servers 130.

The client 102 can be any of a number of devices (e.g., a computer, an internet kiosk, a personal digital assistant, a cell phone, a gaming device, a desktop computer, or a laptop computer) and can include a client application 132, a client assistant 134, and/or client memory 136. The client application 132 can be a software application that permits a user to interact with the client 102 and/or network resources to perform one or more tasks. For example, the client application 132 can be a browser (e.g., Firefox) or other type of application that permits a user to search for, browse, and/or use resources (e.g., web pages and web services) on the client 102 and/or accessible via the communication network 104. The client assistant 134 can perform one or more tasks related to monitoring a user's activities with respect to the client application 132 and/or other applications, searching or browsing for resources (e.g., files) on the client 102, and processing information received from or being sent to information service 106. The client assistant 134 can be part of the client application 132, available as a plug-in to the client application 132 (provided, for example, from various on-line sources), or provided as a stand-alone program. The client assistant can be a web-based messaging application such as the client executable portion of the Google Gmail product. A client memory 136 can store system information and information about a user, among other things.

The communication network 104 can be any local area network (LAN) and/or wide area network (WAN), such as an intranet, an extranet, or the Internet. It is sufficient that the communication network 104 provides communication capability between the clients 102 and the information service 106. In some embodiments, the communication network 104 uses the HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any piece of information or service that is accessible via a Uniform Resource Locator (URL) and can be, for example, a web page, a document, an email message, an Instant Messaging (IM) message, a Short Message Service (SMS) message, a transcribed voice message, a database, an image, or a computational object.

The conversation engine 110 can respond to a variety of requests from the client assistant 134 related to messages and return conversation-based responses via its connection with the communication network 104. A conversation can include one or more relevant messages relating to a conversation topic. Various criteria can be used to determine which messages are part of each distinct conversation. For example, an analysis can be made of the contents of messages received and/or sent by a user. Messages whose contents are found to be related can be grouped together. In another example, a thread identifier found in a message header can also be used to identify related messages. In a further example, a subject line in the message header can be used to identify related messages. The senders and recipients of the messages are participants in the conversation. All messages directed to a user of the information service 106 can be grouped into a plurality of conversations and presented to the user in a conversation-based format, individually or jointly. In a conversation list view, a user can see in a summary form a list of conversations in which the user participates. In a conversation view, the user can see in an expanded form one or more of messages associated with a particular conversation.

The information service 106 can create a snippet of a conversation or a message. A snippet provides a user with a preview of the contents of the conversation or message without the user having to open the conversation or the message. In a list of conversations, the snippet can be generated from the most recent message in the conversation. The snippet can also be extracted from the first message (i.e., the oldest message) in the conversation. The snippet can also be extracted from all the messages in the conversation according to predefined heuristic rules, e.g., listing a set of keywords appearing most frequently in the conversation. If the information service 106 is preparing a list of conversations in response to a search submitted by a user, the information service 106 can create a snippet for each conversation in the list, or for each conversation in a displayed portion of the list, the snippet including a portion of the conversation that matches user-submitted query terms. These snippets may be similar in one or more respects to snippets included in search results returned by a search engine, such as the Google search engine. In a conversation view, a snippet can be generated for one or more messages in the conversation.

The SMTP gateway 122 is also connected to the communication network 104. The SMTP gateway 122 can be directly involved in receiving and sending messages between the information service 106 and other email systems, messaging systems or information services. In some embodiments, the SMTP gateway 122, for example, transmits and receives messages using the simple mail transfer protocol (SMTP). The SMTP gateway 122 can receive a new message from the communication network 104 and send the message to conversation engine 110 for additional processing. Additionally, the SMTP gateway 122 can receive messages from the conversation engine 110 and then transmit (via the communication network 104) those messages to recipient addresses specified in the messages.

The one or more auxiliary services servers 120 can provide additional services to the conversation engine 110. The auxiliary services servers 120 can, for example, include a spam detection module for detecting and processing spam and/or an attachment management module for managing the storage and retrieval of documents or other files attached to messages.

As mentioned above, the conversation engine 110 can be connected to the targeted information processor 124. The targeted information processor 124 can provide targeted information for display to a user at client 102. The targeted information processor 124 can provide, for example, advertisements and/or other information items related to content (e.g., messages or conversations) being provided to the client assistant 134. The targeted information processor 124 can be connected to category information 126 which is used by the targeted information processor 124 to identify various categories as described below. The category information can be used to obtain, for example, category-related advertisements and/or other information. Category-related advertisements can be obtained, for example, from ad server 128. Category-related other information can be obtained, for example, from information item server 130.

FIG. 1 is exemplary. In some embodiments, the information service 106 contains a subset or superset of those elements illustrated in the figure. Although FIG. 1 shows the information service 106 as a number of discrete items, this figure is intended more as a functional description of the various features which may be present in the information service 106 than as a structural schematic of the various embodiments. In practice, and as recognized by those of ordinary skill in the art, items shown separately could be combined and some items could be further divided into sub-elements or parallel elements. For example, some separate elements in the figure could be implemented by a single server and some single items could be implemented by one or more servers or modules. The actual number of servers in information service 106 and how features are allocated among the servers will vary from one implementation to another, and may depend in part on the amount of traffic that the system must handle during peak usage periods as well as during average usage periods. For example, the message database 118 can be implemented using a plurality of servers if the information service 106 manages a large volume of messages associated with a large number of user accounts.

As mentioned above, the client 102 can include a client application 132 and client assistant 134. Client application 132 can provide a window to be displayed on a displaying device (e.g., a monitor) for rendering conversations associated with a particular user. The conversations and messages in the conversations can be encoded using HyperText Markup Language (HTML), XML, or any other appropriate markup language or encoding scheme, and then rendered by the client application 132. When a user submits a request through client application 132 to the information service 106 to access messages stored in the user's account, the information service 106 identifies conversations in the user's account in accordance with the user's request and transfers them as well as a set of display instructions back to the client 102. Client assistant 134 can, in response, generate one or more forms in accordance with the display instructions, where each form can include information of some of the conversations. The forms can then be submitted to and rendered by client application 132. In another embodiment, client assistant 134 may alternatively exist and operate in the information service 106.

The information service 106 and the client assistant 134 work in concert to allow a user to view, compose, send and/or search messages in a user's message account and to present the search results in a highly intuitive fashion. The information service 106 extracts information from a user's message account by processing messages received, sent and/or being composed by the user, and the client assistant 134 assists in rendering the information prepared by the information service 106. In other embodiments a different division of duties between the information service 106 and the client assistant 134 can be implemented. Because many of the tasks performed by the system can be performed by either the information service 106 or the client assistant 134 or by the two working together, these two components are sometimes herein referred to jointly as the "conversation system".

The conversation system can provide at least two different views including a conversation list view and a conversation view as mentioned briefly above. In a conversation list view, a plurality of conversations can be displayed where each conversation can be displayed in a summary form. For example, each conversation can be represented by a number of conversation elements. The conversation elements can include one or more of: a number indicating the number of messages in the conversation, a list of one or more of the identifiers or names of the senders of messages in the conversation, a conversation description (e.g., a subject line of the message), a date/time value of the conversation (e.g., a date/time value of the last received message in the conversation), and a snippet from one or more of the messages in the conversation. In one approach, each conversation can be represented as a single row in the conversation list view.

In a conversation view, one or more messages from a conversation can be displayed. Each message can be displayed in one of a number of various modes, for example an expanded mode, a compacted mode, or a compressed mode. In an expanded mode, the body of the message can be displayed along with, for example, header information including names or other identifiers of the sender and the recipients of the message, a date/time value indicative of when the message is received or sent, routing information, and other properties of the message. An expanded mode can be used, for example, for messages which are marked as "unread." In a compacted mode, the message body can be hidden and a snippet from the message is provided in its place. The snippet can be chosen to occupy less space than the body. For example, a snippet can be chosen to occupy only one line in a display window. The compacted mode can be used for messages which have been read or marked as read. The compacted mode allows messages in a conversation view to be displayed within the same window more densely than if the expanded mode were used. In a compressed mode, a message can be represented with a small bar. The small bar can contain no message information. The visual effect of such a mode can be that multiple compressed messages appear like the edges of cards in a deck of cards. A user can toggle between the various display modes by selecting a message or using various controls in the display window. It should be understood that the techniques described in this specification with reference to a conversation (as might be found in the Google Gmail product) can be equally used with any message system (e.g., Outlook or Thunderbird) where messages can be displayed in various views (and can include portions of messages) such as a message view or a thread view where related messages can be displayed.

In some embodiments, when a conversation is being displayed in the conversation view, additional, targeted information (sometimes herein called "informational items") can be displayed in the display window. For example, one or more advertisements relevant to, or related to, one or more of the messages in the conversation can be displayed. In another example, one or more other types of information can be displayed. Such other information can include, but is not limited to news items or links to news items, map links, phone numbers, links to product information, stock prices or links to stock prices, links to weather forecasts, web page links, dictionary entries or links to dictionary entries, images or links to images, RSS feeds or links to RSS feeds, links to blog (web log) events, links to user polls, links to files or other content on the client 102, and other types of information.

RSS feeds can be content distributed from various sources on a network (e.g., the Internet). RDF Site Summary (RSS) (and sometimes, Real Simple Syndication) is an XML-based lightweight multipurpose extensible metadata description and syndication format. RSS is typically used for distributing various types of content to a number of receivers simultaneously. News items can be news items from one or more sources. Blog events can be events generated from one or more web logs (blogs). User polls can be polls that the user may participate in which may come from a variety of sources. Stock prices can be stock prices of companies whose names or stock ticker symbols are mentioned in the conversation. Weather forecasts can be weather forecasts of locations like cities or states whose names are directly or indirectly referred to by a message in the conversation.

Multiple factors affect the relevancy of an information item to a user of the information service. For instance, the relevancy of the information item to a user in many ways depends on the contents of the input associated with the user. Generally, when an advertising service returns advertisements based on text input, the more closely aligned the text input is with a concept or category that is also associated with the returned advertisements, the more relevant the returned advertisements are likely to be to the user. In some types of messages, certain terms or word phrases are frequently found, but may not be useful in obtaining relevant advertisements.

For example, an electronic message from an on-line store notifying a customer that the product he or she ordered has been shipped might include, among other things, the product name and phrases such as "order has shipped", "left the warehouse", or "international air". An advertising service receiving as input the entire message text including both the product name and one or more of these boilerplate-type phrases might inadvertently return advertisements related to shipping, warehouses, or international shipping. These advertisements, although relevant to the phrases, are probably of little interest to the customer, who is more interested in the product.

Figure 2:
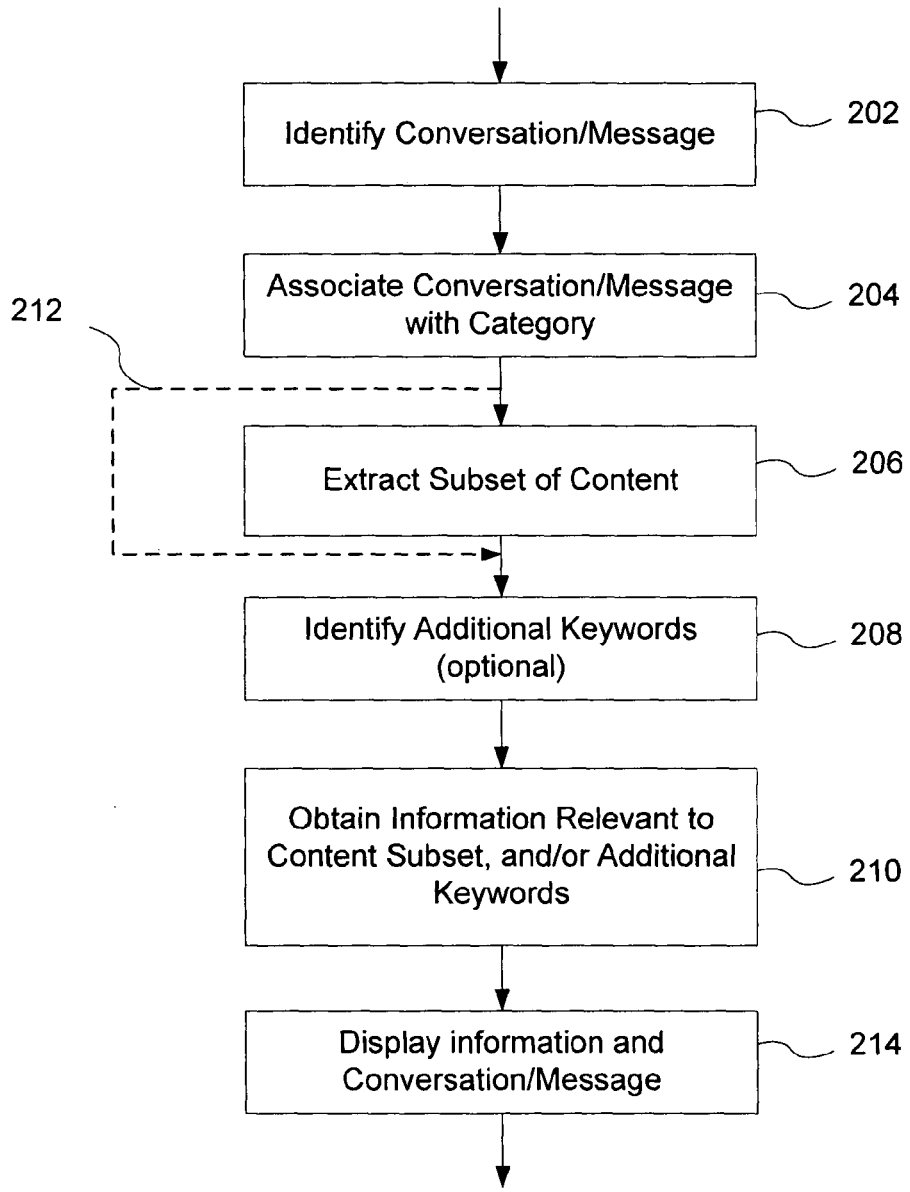
FIG. 2 is a flow diagram of a process for generating targeted information based on message content in accordance with some embodiments of the present invention.

FIG. 2 illustrates a process by which targeted information can be generated for one or more messages according to some embodiments of the invention. Initially, a conversation is identified (202). For example, a conversation may be identified when a user selects a conversation to be displayed. As mentioned above, a conversation can include one or more related messages. The identification at 202 can identify all of the messages in a conversation or selected messages in a conversation. Various criteria can be used when identifying selected messages in a conversation. For example, messages can be identified based on the display mode of a message (e.g., identified messages are messages which are being displayed in an expanded mode). In another example, messages can be identified based on a time factor of a message within a conversation (e.g., the most recently received message is identified). Although the following discussion assumes that all the messages in a conversation have been identified, the same techniques can be used when less than all the messages are identified.

The identified conversation can then be associated with one or more categories (204). Some examples of categories include, but are not limited to, online shopping, shipping, travel, entertainment, dining, online auctions, health/beauty, taxes, real estate, computer software and hardware, and mortgages. More generally, the categories associated with conversations can include categories of things, activities, processes, concepts and the like. Some conversations may not be related to any category. In some instances a conversation can, therefore, have no associated category. After determining that a conversation belongs to one or more categories, a subset of the content of the conversation can then be extracted (206). The content of a conversation from which a subset can be extracted can include one or more of the following: a conversation description (e.g., a subject line of the message), one or more message bodies, a message sender domain, a message sender, a conversation label, one or more message labels, one or more message recipients, other message information, or information related to a conversation. What is extracted from a conversation into the subset can be dependent on a category identification. The extraction can aid in obtaining information relevant to a conversation by, for example, excluding from the subset content elements in the conversation which may cause information not relevant to the pertinent portions of message to be returned from an information service (e.g., an advertisement service). Generally speaking, a content element is one or more terms, such as a word or word phrase.

In some embodiments, one or more additional keywords can be identified (208), which can be added to the subset prior to the subset being used to obtain relevant information. These additional keywords, which can be dependent on a category identification, can increase a desired relevancy of the information returned from an information service. For example, a "travel" category can be identified for an airline itinerary message to a consumer. Furthermore, when the travel category is so identified, it can be useful to add travel related keywords, such as "hotel" and "car rental", when forwarding extracted content to an information service. Accordingly, the additional keywords can be content elements that are related to a category but may not be present in a message associated with the category.

The content in the conversation can be used to determine which additional keywords are added. For example, an airline itinerary message to a consumer for an international flight may have "passport" and related, additional keywords added to the content sent to the information service, whereas an airline itinerary message for a domestic flight may not, even though both can be identified as associated with the travel category. As another example, in a flight itinerary, the destination of a flight can be determined (e.g., by identifying or decoding a city, airport or other location code) and the name of the destination can be added to the subset.

Information relevant to the extracted content is then obtained (210) from one or more information services (e.g., ad server 128 and/or information item server 130). The input provided to the information services can include one or more additional keywords identified at 208. In some embodiments (as represented by the dashed line at 212 in FIG. 2), additional keywords can be used in place of content extracted from a conversation.

The information obtained from the information services can be displayed with the conversation (214). When the display is on a client 102, the information service 106 can provide formatting information directing the simultaneous display of the information and the conversation in one or more transmissions to the client 102.

Figure 3:
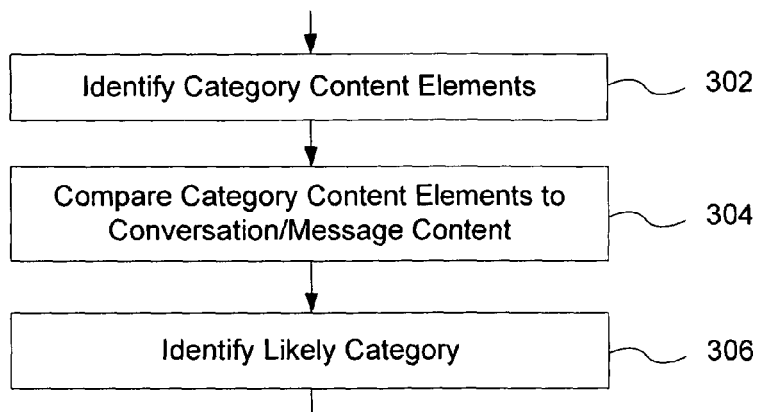
FIG. 3 is a flow diagram of a process for identifying a category for message content in accordance with some embodiments of the invention.

FIG. 3 illustrates an exemplary process for associating a conversation with a category according to some embodiments. Initially, category content elements can be identified (302). Category content elements can be organized into lists of content elements, where each list can be associated with a category. As mentioned earlier, each content element can comprise one or more terms. Broadly speaking, a category list for a category can comprise those content elements which are associated with that category. When the number of content elements associated with a particular category are included in a conversation has reached a threshold, then it is more likely than not that the conversation belongs to that particular category. In another embodiment, when the percentage of content in a conversation which is associated with a particular category has reached a threshold, then that conversation belongs to the category. However, a conversation can potentially include content elements from more than one category. Certain metrics can be used to distinguish a most likely category from among categories that have some of their content elements present in a conversation. Returning to FIG. 3, the conversation content can be compared against the category content elements (304) and the most likely category can be identified (306). The content of a conversation that can be compared to the category lists can be one or more of a conversation description such as the message subject, one or more message bodies, a message sender domain, a message sender, a conversation label, one or more message labels, one or more message recipients, other message information, or information related to a conversation.

Category lists can be compared against a conversation content in a number of ways. For example, the number of times a particular content element from a category list appears in a conversation can be identified. In another example, each of the category lists and the conversation can be treated as a vector of terms and a comparison of a category list to the conversation can be a vector distance. When a conversation has messages that can include the content of a previous message (e.g., as might be found in a reply message), that previous content can be ignored. The most likely category to which a conversation belongs can also be determined in a number of ways. For example, a category having the most number of unique content elements present in the conversation can be identified as the most likely category. As another example, a category that has the highest ratio of the number of content elements which belong to that category as compared to the total number of content elements present in the conversation can be identified as the most likely category. If no content elements from any category content element list are present in the conversation, or if no metrics for any category are greater than a threshold (e.g., the number of unique content elements associated with a category list present in the conversation does not exceed a threshold), the conversation can be associated with no category.

Figure 4:
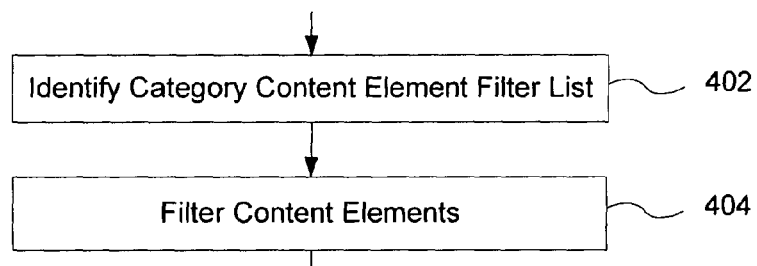
FIG. 4 is a flow diagram of a process for filtering message content in accordance with some embodiments of the present invention.

FIG. 4 illustrates an exemplary process for extracting a subset of the content from a conversation according to some embodiments. Initially, a category content element filter list can be identified (402). Each category (or each category in a subset of predefined categories) can have a filter list of content elements associated with it (i.e., a category content element filter list). Each filter list can comprise content elements which are associated with a particular category, but which, if included in the input provided to the information service (e.g., an ad service) may be likely to result in non-relevant information being returned. For example, a filter list for a category of "online shopping" can include the content element "receipt" and/or "your order has shipped". Once the appropriate filter list has been identified, a content subset can be created by filtering those content elements in the list from the conversation (404). Other content elements can also be filtered which may not be directly related to a specific category, but nonetheless may be likely to result in an information service returning information not directly relevant to the conversation. For example, message header information and selected message component identifiers (e.g., "To:") can be filtered from a conversations, regardless of the identified category.

Figure 5:
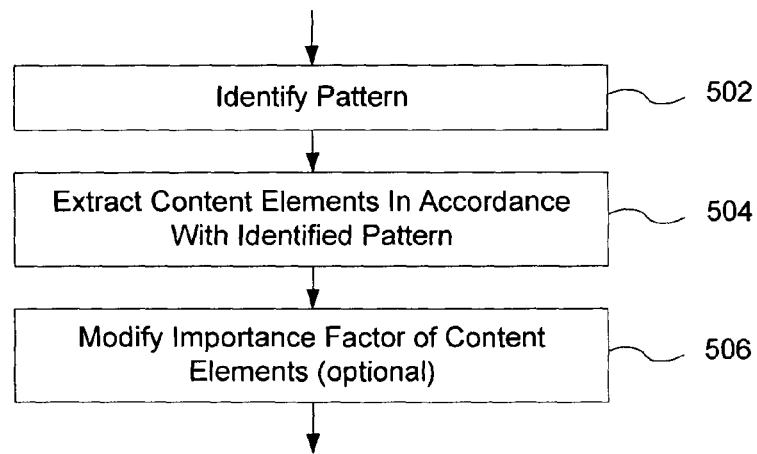
FIG. 5 is a flow diagram of a process for identifying a pattern in message content and boosting the importance of certain content elements in accordance with some embodiments of the present invention.

FIG. 5 illustrates another exemplary process for extracting a subset of the content from a conversation according to some embodiments. The process of FIG. 5 can be used alone or in combination with the process of FIG. 4. A conversation can be examined to identify one or more patterns in the conversation (502). Messages from service providers can contain patterns within which can be embedded information specifically related to the service. For example, an automated shipping notification message can include a shipping notification pattern comprising one or more labels and associated text. The labels can be common to many messages, but the associated text is more interesting from an information service point of view. The associated text can include, for example, the name of the product being shipped. In another example, a reservation confirmation message from an online dining reservation system can contain a pattern within which the most relevant information (e.g., the restaurant name) is embedded. In a reservation confirmation message the pattern can include, for example, the following text: "Your reservation is confirmed at". Once the pattern has been identified, the content elements associated with the pattern can be filtered and the remaining content elements extracted to the subset (504).

Optionally, an importance factor associated with one or more extracted content elements can be modified (506). An input to an information service (e.g., ad server) can include information relating to the importance of one or more of the content elements in the input. Based on various criteria, it can be determined that one or more content elements provided in an input to an information server (e.g., an ad server) should be treated differently from other content elements. Accordingly, the output of the information server can be weighted toward those content elements deemed important and/or down-weighted for content elements deemed unimportant. One or more content elements associated with a particular part of a pattern can be accorded importance factors different from other parts of the extracted subset. For example, a content elements associated with a product name can be accorded more weight than other extracted content elements. As another example, a content element identified as a destination shipping address in a receipt for online shopping can be down-weighted in importance.

Figure 6:
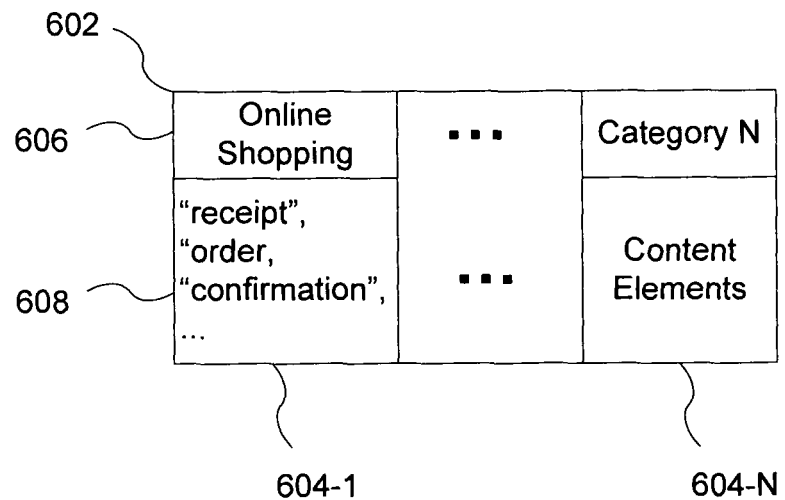
FIG. 6 depicts an exemplary data structure for one or more category lists according to some embodiments of the present invention.

FIG. 6 illustrates an exemplary data structure for storing one or more category lists in accordance with some embodiments of the invention. Many other data structures, such as tree data structures, may be used to store category list information in other embodiments. A category list data structure 602 can include one or more category lists such as category list 604-1 to category list 604-N, where N is the number of predefined categories. Each category list can include a category identifier portion, such as category identifier portion 606, which identifies the category to which the category list is associated. Each category list can also include a content element list portion, such as content element list portion 608, which includes one or more content elements corresponding to the category with which the content element list is associated. The content element list portion 608 provides some exemplary content elements (e.g., "receipt") associated with an online shopping category. The content elements in each category list can be used to identify the category (or categories) to which one or more parts of a conversation belong. As discussed earlier, a conversation can be associated with one or more different categories. A content element can be present in multiple category lists.

Figure 7:
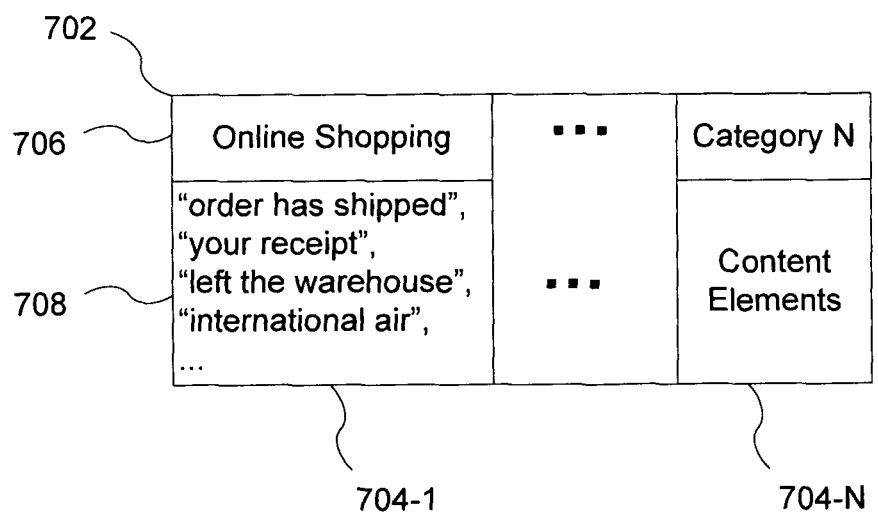
FIG. 7 depicts an exemplary data structure for one or more filter lists according to some embodiments of the present invention.

FIG. 7 illustrates an exemplary data structure for storing one or more filter lists in accordance with some embodiments of the invention. Many other data structures, such as tree data structures, may be used to store filter list information in other embodiments. A filter list data structure 702 can include one or more filter lists such as filter list 704-1 to filter list 704-N, where N is the number of categories. Each filter list can include a category identifier, such as category identifier portion 706, which identifies the category to which the filter list is associated. Each filter list can include a filter list portion, such as filter list portion 708, which includes one or more content elements corresponding to the category with which the filter list is associated. The filter list portion 708 shown in FIG. 7 provides some exemplary content elements (e.g., "order has shipped") associated with an online shopping category. The content elements in each filter list can be used to filter out content elements which might result in an information server return non-relevant information.

FIGS. 6 and 7 each illustrate one of many possible data structures for storing category lists and category filter lists. One of ordinary skill in the art will recognize other ways that the information can be organized to achieve the same result.

Figure 8:
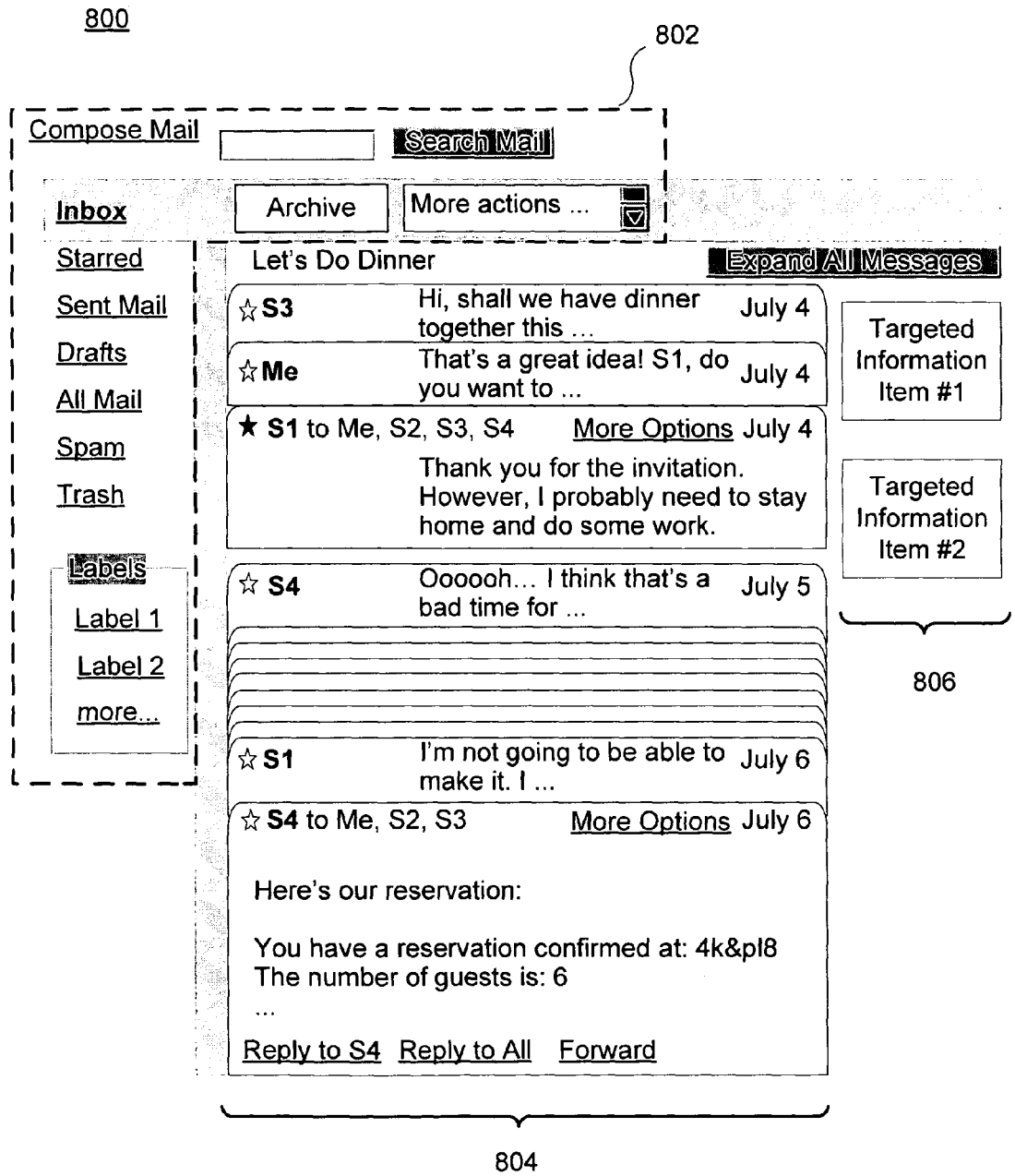
FIG. 8 illustrates an exemplary screenshot of a conversation and targeted information in accordance with some embodiments of the present invention.

FIG. 8 provides an exemplary screenshot of a display with a conversation and targeted information items in accordance with some embodiments of the invention. FIG. 8 provides one exemplary display organization for illustration purposes only and does not serve to limit the ways conversations and targeted information items can be displayed. The display area 800 can include 3 major display portions: a navigation and control portion 802, a message portion 804, and a targeted information item portion 806. The navigation and control portion 802 can include one or more navigation and/or control items (e.g., "compose email"). The message portion 804 can include a conversation description and one or more messages associated with a conversation. The targeted information item portion 806 can include one or more information items which have been obtained as a result of the techniques described above. For example, the information items may be obtained from an ad server 128 and/or information item server 130 (FIG. 1). Although FIG. 8 shows two information items, the number of information items displayed may be smaller or larger, and may vary from one conversation to another or from one information view (e.g., view conversation list) to another (e.g., view selected conversation). FIG. 8 illustrates only one exemplary layout configuration and other layouts are possible. For example, the relative position of the display areas to each other may change (e.g., the targeted information item portion 806 can be displayed to the left, right, bottom, or top relative to the message portion 804).

Figure 9:
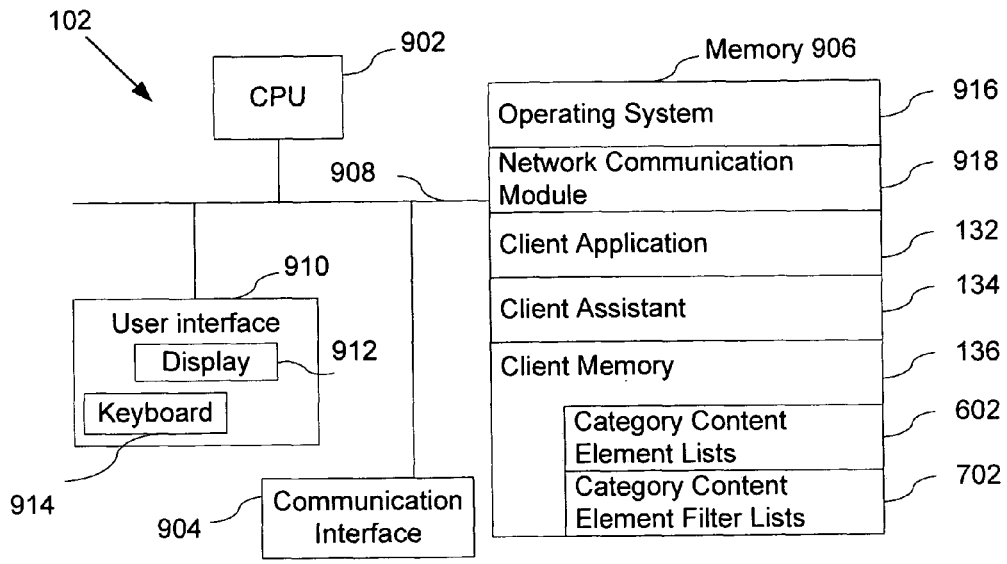
FIG. 9 is a block diagram of an exemplary client in accordance with some embodiments of the present invention.

FIG. 9 is a block diagram illustrating a client 102 in accordance with one embodiment of the present invention. The client 102 typically includes one or more processing units (CPUs) 902, one or more network or other communications interfaces 904, a memory 906, and one or more communication buses 908 for interconnecting these components. The client 102 optionally may include a user interface 910 comprising a display device 912 and a keyboard 914. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 may optionally include one or more storage devices remotely located from the CPU(s) 902. In some embodiments, the memory 906 stores the following programs, modules and data structures, or a subset thereof:

- an operating system 916 that includes procedures for handling various basic system services and for performing hardware dependent tasks;
- a network communication module 918 that is used for connecting the client 102 to other computers via the one or more communication network interfaces 904 and one or more communication networks, such as the Internet, other wide area networks, local area networks, metropolitan area networks, and so on;
- a client application 132 that can permit a user to interact with the client 102 as described above;
- a client assistant 134 that can perform one or more tasks as described above; and
- a client memory 136 that can optionally include category list data structure 602 and filter list structure 702, examples of which are described above.

Figure 10:
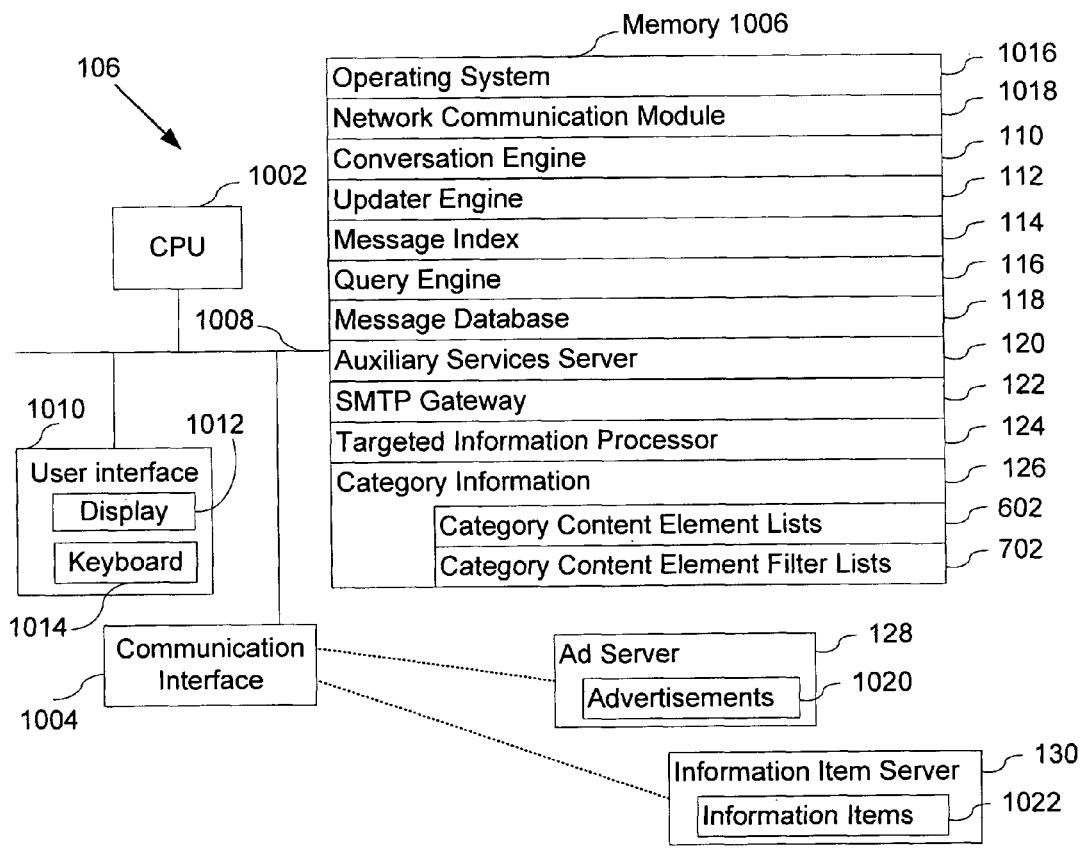
FIG. 10 is a block diagram of an exemplary information server in accordance with some embodiments of the present invention.

FIG. 10 is a block diagram illustrating an information service 106 in accordance with one embodiment of the present invention. The information service 106 typically includes one or more processing units (CPUs) 1002, one or more network or other communications interfaces 1004, a memory 1006, and one or more communication buses 1008 for interconnecting these components. The information service 106 optionally may include a user interface 1010 comprising a display device 1012 and a keyboard 1014. The memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1006 may optionally include one or more storage devices remotely located from the CPU(s) 1002. In some embodiments, the memory 1006 stores the following programs, modules and data structures, or a subset thereof:

- an operating system 1016 that includes procedures for handling various basic system services and for performing hardware dependent tasks;
- a network communication module 1018 that is used for connecting the information service 106 to other computers via the one or more communication network interfaces 1004 and one or more communication networks, such as the Internet, other wide area networks, local area networks, metropolitan area networks, and so on;
- a targeted information processor 124 for obtaining targeted information for a conversation as described above; and
- category information 126 that can include category list data structure 602 and filter list structure 702, examples of which are described above.

In some embodiments, the information service 106 includes the following elements, or a subset or superset of such elements: a conversation engine 110 for responding to a variety of requests from the client assistant 134 returning conversation-based responses; an updater engine 112 for updating a message database 118; a message index 114 containing index information for messages in the message database 118; a query engine 116 for performing various queries using the message index 114 and message database 118; an auxiliary services server 120 for performing various auxiliary services; and an SMTP gateway 122 for sending and receiving messages.

The information service 106 can be connected to ad server 128 and/or information item server 130 via the communication interface 1004. Ad server 128 can contain one or more advertisements 1020. The ad server 128 can receive input and return advertisements that can be relevant to the input. The information item server 130 can include one or more information items 1022. Similar to the ad server 128, the information server 130 can receive input and return informational items that can be relevant to the input.

Each of the above identified elements in FIGS. 9 and 10 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 906 may store a subset of the modules and data structures identified above. Furthermore, the memory 906 may store additional modules and data structures not described above.

Although FIGS. 9 and 10 show, respectively a client 102 and an information service 106, the figures are intended more as functional descriptions of the various features which may be present in a client and set of servers than as a structural schematic of the embodiments described herein. In practice, and as recognized by those of ordinary skill in the art, items shown separately could be combined and some items could be separated. For example, some items shown separately in FIG. 10 could be implemented on single servers and single items could be implemented by one or more servers. The actual number of servers used to implement an information service 106 and how features are allocated among them will vary from one implementation to another, and may depend in part on the amount of data traffic that the system must handle during peak usage periods as well as during average usage periods.

Targeting Information Based on Identified Information Entities in Message Content As mentioned in the background section, an electronic document often includes one or more information entities that a reader may take further actions upon them while reading the document. For example, the electronic document may be an email message that includes a new address of his or her friend who has recently relocated to a different city. The reader may prefer to include the new address in his or her address book immediately. Sometimes, he or she may want to obtain the driving directions to the new address. Conventionally, the reader manually copies and pastes the new address into the address book. This is tedious and error-prone.

The following discussion is devoted to an alternative embodiment of the present invention. According to this embodiment, before serving an electronic document to a requesting user, the electronic document and a set of predetermined information entity types are first submitted to an information entity server. The server is responsible for extracting from the document information entities matching the predetermined information entity types. Next, the information entity server submits to one or more information item servers (e.g., ad server, map server, and weather forecast server, etc) requests corresponding to the extracted information entities to retrieve relevant information that might be of interest to the user. Finally, the relevant information and/or links to some of the relevant information are served to the requesting user together with the requested electronic document. For illustrative purposes, an email message is used as an exemplary document in the following discussion. But one skilled in the art will appreciate that the same techniques can be applied to other types of electronic documents such as web pages, documents, Instant Messaging (IM) messages, Short Message Service (SMS) messages, transcribed voice messages, and any combination thereof.

Figure 11:
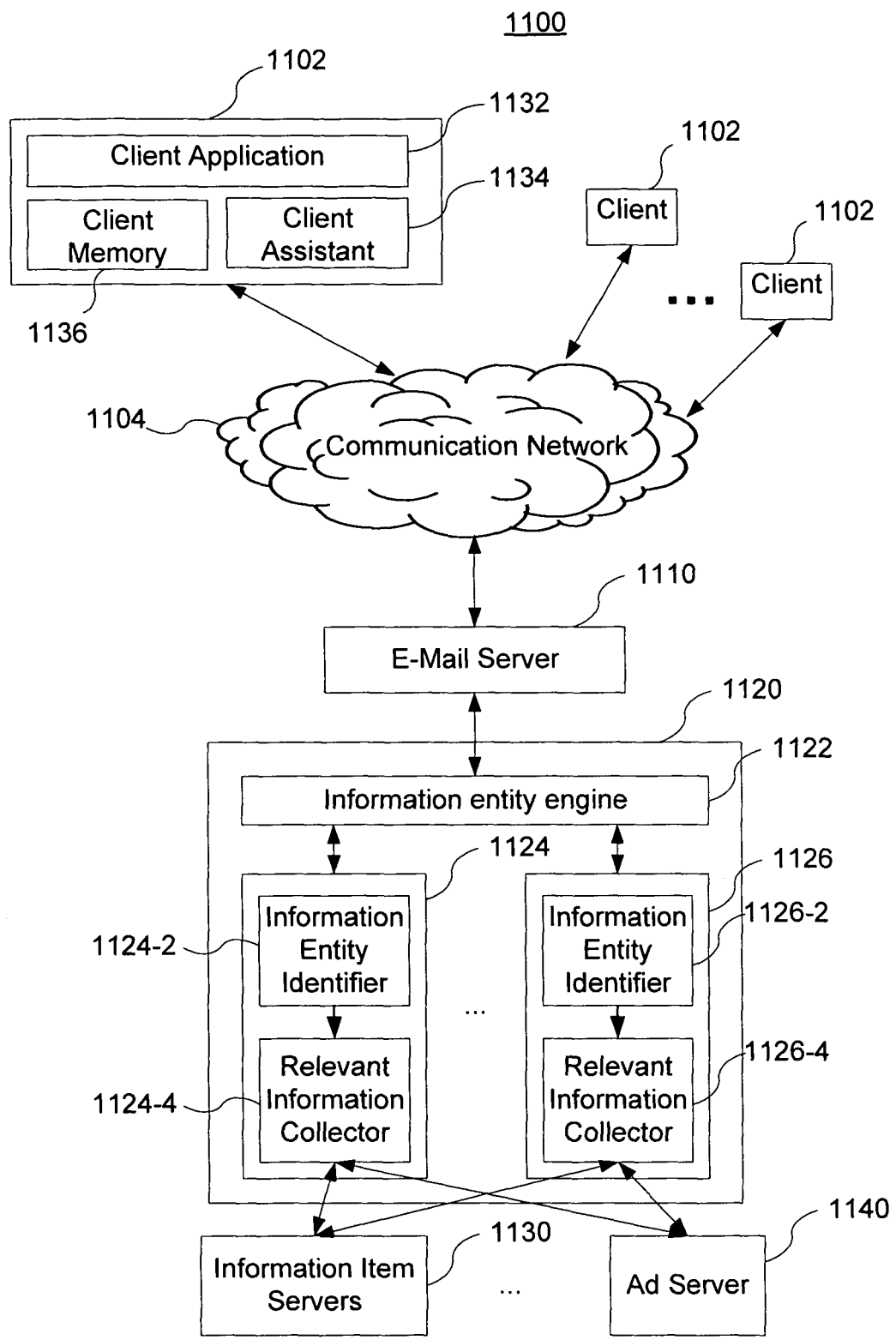
FIG. 11 is a block diagram of an exemplary system that generates targeted information based on information entities identified in message content in accordance with some embodiments of the present invention.

FIG. 11 is a block diagram of an exemplary system 1100 that generates targeted information based on information entities identified in message content in accordance with some embodiments of the present invention. Note that the client and network aspects of system 1100 in FIG. 11 are similar to those aspects of system 100 in FIG. 11. Therefore, the following discussion primarily concerns the server portion of system 1100.

The communication network 1104 is connected to an email server 1110 on the server side. In some embodiments, the email server 1110 may have a structure similar to the information service 106 shown in FIG. 1. The email server 1110 is connected to an information entity server 1120. In some cases, the information entity server 1120 and the email server 1110 may co-exist on the same computer server. In some other cases, they may operate from different computer servers.

The information entity server 1120 includes an information entity engine 1122 that receives requests from and sends responses to the email server 1110. Within the information entity server 1120, there are one or more information entity modules (1124, 1126). Each module is responsible for identifying one or more information entities and collecting information related to the information entities from other sources. Generally speaking, these modules operate independently from each other in any order. In some embodiments, however, one module's operation may depend on the information entities identified by another module or modules. In such embodiments, the information entity engine 1122 is configured to sequentially execute the modules in an order consistent with the dependencies of one or more of the modules on the prior execution of other ones of the modules.

An information entity module (1124, 1126) may further include sub-modules: an information entity identifier (1124-2, 1126-2) and a relevant information collector (1124-4, 1126-4). The information entity identifier (1124-2, 1126-2) is responsible for identifying any occurrences of an information entity type in an email message content and then forwarding the identified information entities to the relevant information collector (1124-4, 1126-4). For each identified entity, the corresponding information collector (1124-4, 1126-4) makes an optional information request to one or more backend information item servers 1130 and/or advertisement servers 1140 to collect information items that are deemed relevant to the identified information entity.

In some embodiments, unless there are specified dependencies between different modules, the information entity modules process the content of a message (or a set of messages) in an arbitrary order, or in parallel. Requests to backend information item servers 1130, 1140 may be made in parallel (e.g. during overlapping time periods), by the modules. In other embodiments requests to backend information item servers 1130, 1140 are made sequentially by the modules 1124, 1126, in same order that the modules are process the content of a message. After receiving responses to the backend requests, the modules associate the collected information items with the corresponding information entities and return the collected information items to the information entity engine 1122. The information entity engine 1122 compiles the responses from the different modules and generates an ultimate response to the email server 1110.

Figure 12:
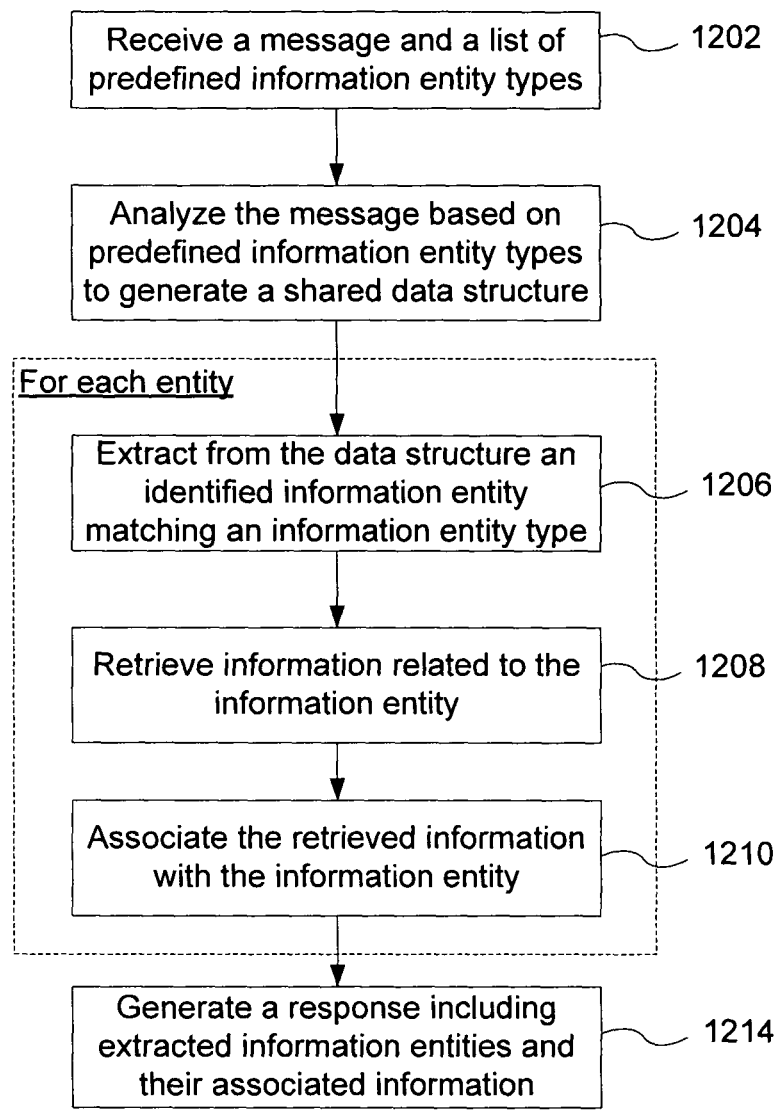
FIG. 12 is a flow diagram of a process for identifying in message content one or more information entities matching one or more predefined information entity types in accordance with some embodiments of the present invention.

FIG. 12 is a flow diagram of a process for identifying in a message content one or more information entities matching one or more predefined information entity types in accordance with some embodiments of the present invention. Initially, the information entity server receives a message and a list of predefined information entity types (1202). In some embodiments, the list may include, but is not limited to entity types corresponding to physical addresses, email addresses, common search phrases, billing statements, birthdays, predefined tasks, uncommon words or phrases, acronyms, phone numbers, object identification numbers (e.g., package shipment tracking numbers, International Standard Book Numbers (ISBN's), etc.), product names, company names, stock ticker symbols, movie titles, book titles, calendar entries, names of individuals (e.g., celebrities), city names, URLs, predefined event information, airline flight information, or any subset thereof. The list of entity types may include additional entity types. In some embodiments, the information entity type list accompanying the message depends on the attributes of the message, such as subject, sender information, recipient information, conversation topic, etc. In some other embodiments, the list of information entity types is the same for all messages and is therefore known to the information entity server 1120 in advance of receiving the message. The following table lists examples of relevant information that may be provided, and/or potential action(s) that may be performed by clicking on link provided in connection with several types of information entities. Some embodiments of the present invention may implement only a subset of these examples.

TABLE 1

| Information Entity Type | Potential Action(s) and Relevant Information |
| --- | --- |
| Physical addresses | Updating contact book, links to maps and driving directions |
| Email addresses | Updating contact book |
| Billing statements | Link to an on-line bill payment service |
| Birthday | Updating contact book |
| Predefined tasks | Link to a how-to article |
| Uncommon words or phrases | Dictionary definitions |
| Acronym | A complete expression; dictionary definition |
| Phone number | Updating contact book; link to VoIP phone service, if available |
| Object identification number (e.g., package shipment tracking number, International Standard Book Number (e.g., ISBN), etc.) | Link to shipment status; link to on-line bookstore |
| Product name | Link to product review pages, product image(s) and/or price comparison |
| Company name | Link to company website; link to news items |
| Stock ticker symbols | Stock price; links to news items and brokerage firms |
| Movie title | Link to movie rankings; link to movie reviews; link to movie schedule at a nearby movie theater |
| Books title | Link to on-line auction stores; link to book reviews |
| Calendar entries | Updating personal calendar |
| Name of individual (e.g., a celebrity) | Link to news items; link to personal website |
| City name | One or more links to hotel rentals, weather forecast, airfare, and/or tourist sites |
| URL | Thumbnail of web page; link to a web page |
| Predefined event information, airline flight information | Updating personal calendar; link to a list of attendees; link to information about the event |
| Airline flight information | Link to information about the flight |

The server analyzes the message content based on the information entity type list (1204). By default, the information entity server is responsible for analyzing the message content against every information entity type unless the email server instructs otherwise. For example, the email server may determine for a particular message whether the information entity server 1120 should analyze the message to look for information entities matching a particular information entity type. The analysis by the information entity server includes identifying occurrences of each listed information entity type in the message content. An information entity module is invoked if one or more information entity types associated with the module appears in the information entity type list. Typically, information entity types that are closely related will be associated with the same information entity module. For example, physical address, email address and phone number are associated with a module responsible for any information entity type related to contact information.

In some embodiments, every invoked information entity module updates a data structure associated with the message and shared by all the modules. The data structure includes a list of annotations of the message being analyzed. In some embodiments, the data structure has an interface that enables quick iteration by the information entity modules and quick lookup of annotations in the list of annotations. Annotations associated with a particular information entity type within a particular range of bytes of the message can be easily identified in the data structure. There are at least two advantages of sharing the data structure among different modules. First, this allows the processing result of one module to be reused by a subsequent module, rather than having the subsequent module repeat the process. For example, if a message has been tokenized by one module, by adding an annotation to the data structure for each token identified in the message, a subsequent module can iterate over the tokenized annotations without re-tokenizing the message. Second, the shared data structure stores all information entities that have been found in the message so that each module can operate in a stateless mode, which simplifies the implementation of the information entity modules.

For each information entity identified in the message, a corresponding information entity module extracts it from the data structure (1206). Next, the information entity module submits an optional information request associated with the entity to a backend information source(s) (e.g., a map server) and retrieves related information provided by the backend information source(s) (1208). In some embodiments, the information entity module submits a search query to the backend information source(s) and the query includes at least one term corresponding to the information entity. From the query results, the information entity module selects the most relevant items and associates it with the information entity (1210). After all information entity modules have received responses to their respective requests, the information entity server generates an ultimate response containing all extracted information entities and their associated information (or a selected subset of the extracted information entities and their associated information) to the email server (1214). In some embodiments, the response includes display instructions for formatting and displaying one or more of the extracted information entities and their associated information at a client device.

In some other embodiments, an information entity module generates one or more links associated with the information entity. A link may contain a search query to a specific information source. For example, if the identified information entity is a product name, the link could be a search query prepared for a product search engine like the Froogle search engine. In this case, the information entity module does not submit information requests to backend information sources. Rather, links are provided to an end user and he or she only needs to click on a link to get the relevant information. In yet some other embodiments, the information entity module generates requests as well as links for an information entity and serves both types of responses to the end user. For example, if the identified entity is an address, it may be desired to serve to the end user both a thumbnail-style map and a link to driving directions in connection with the requested email message.

FIGS. 13A-13C, 14A-14D, 15A-15B and 16 contain screenshots illustrating the types of information entities that may be identified in an email message and the information and/or links that are served to an end user requesting the email message in accordance with some embodiments of the presentation.

Figure 13A:
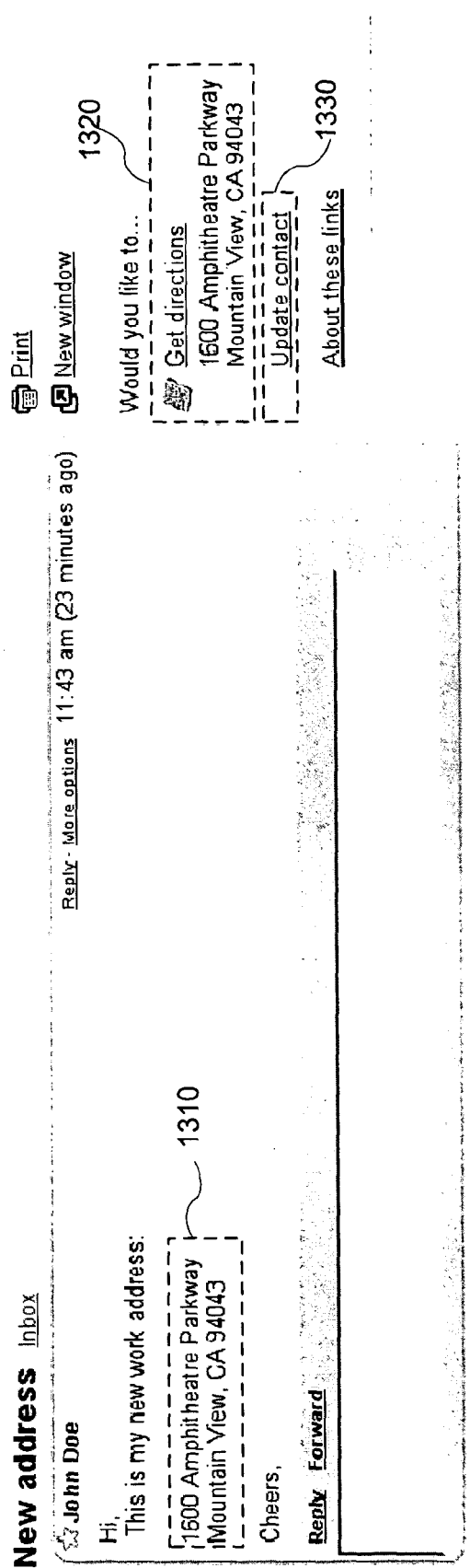
Figure 13B:
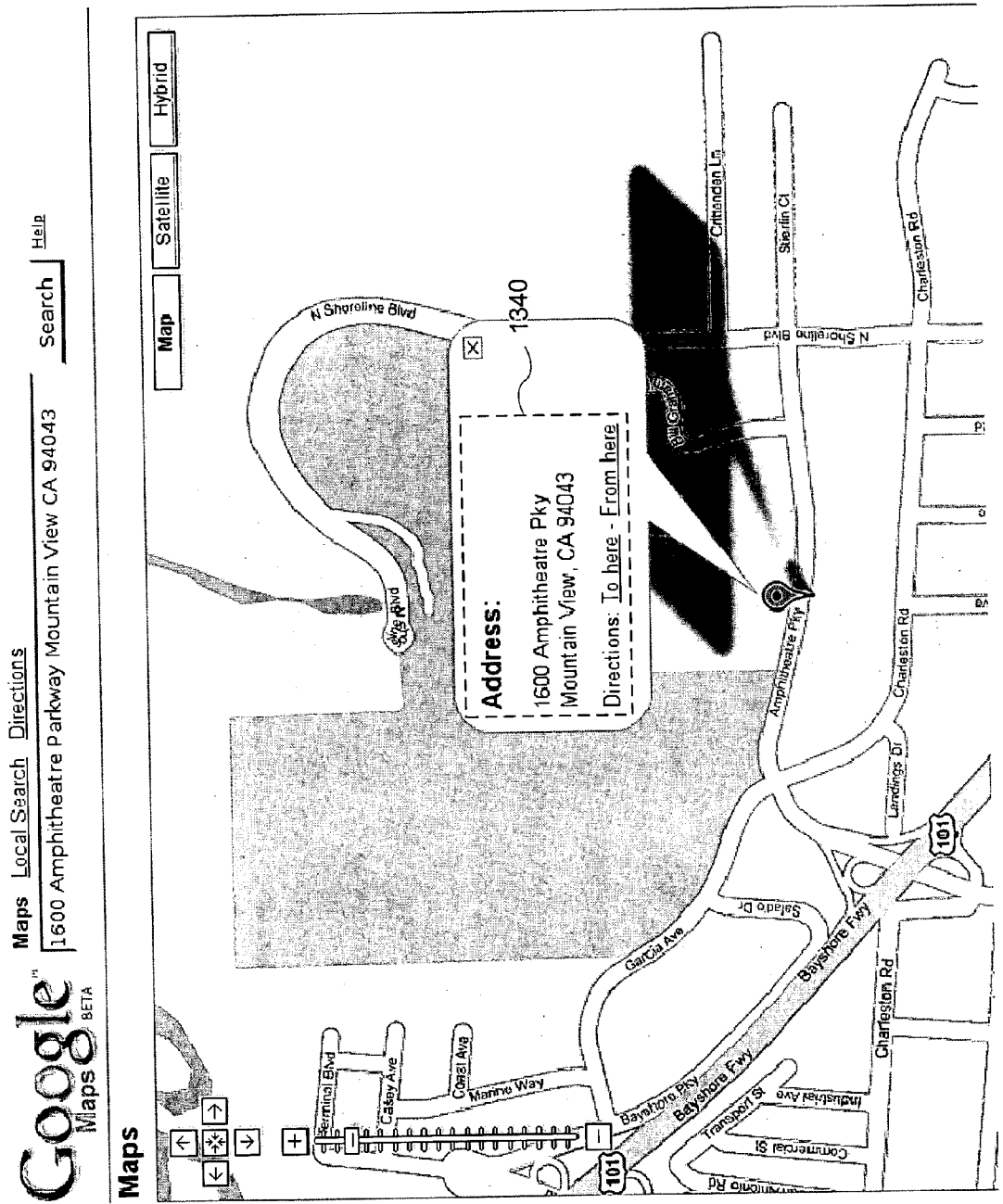

FIG. 13A is an exemplary screenshot of an email message including an address as well as links associated with the address and information corresponding to the address. The message body includes a physical address 1310. This address is identified by the information entity server and extracted from the message body. The extracted address is reproduced to the right of the message body and displayed as a link 1320 to driving directions. A user clicking on this link will be directed to a map of the physical address as shown in FIG. 13B. Below this driving direction link 1320 is another link 1330 to update the contact information of the sender. When the user clicks on link 1330, a separate window (FIG. 13C) pops up with pre-populated fields 1350 derived from the message shown in FIG. 13A.

Figure 14B:
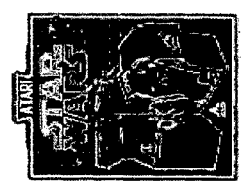
Figure 14C:
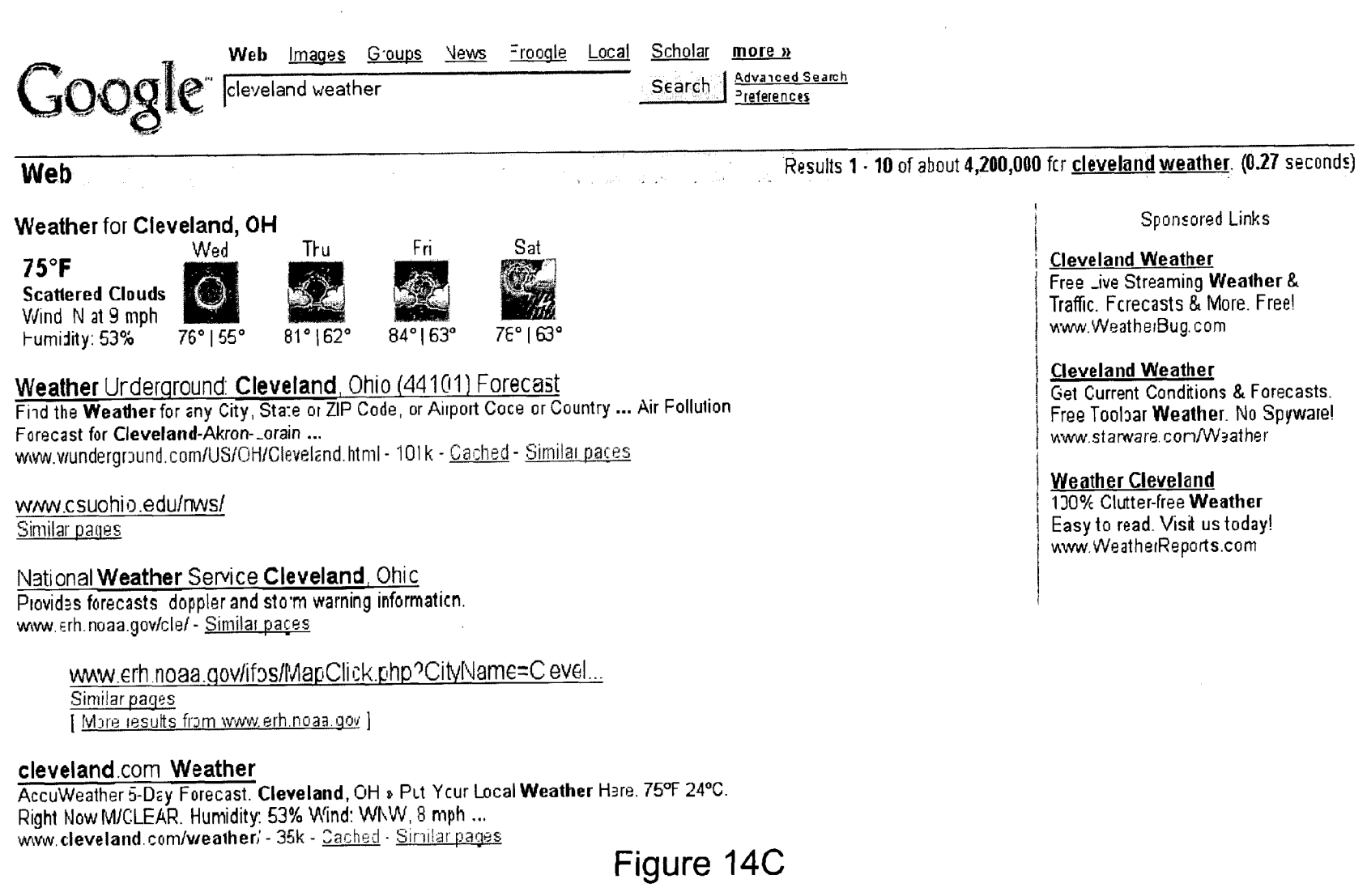
Figure 14D:
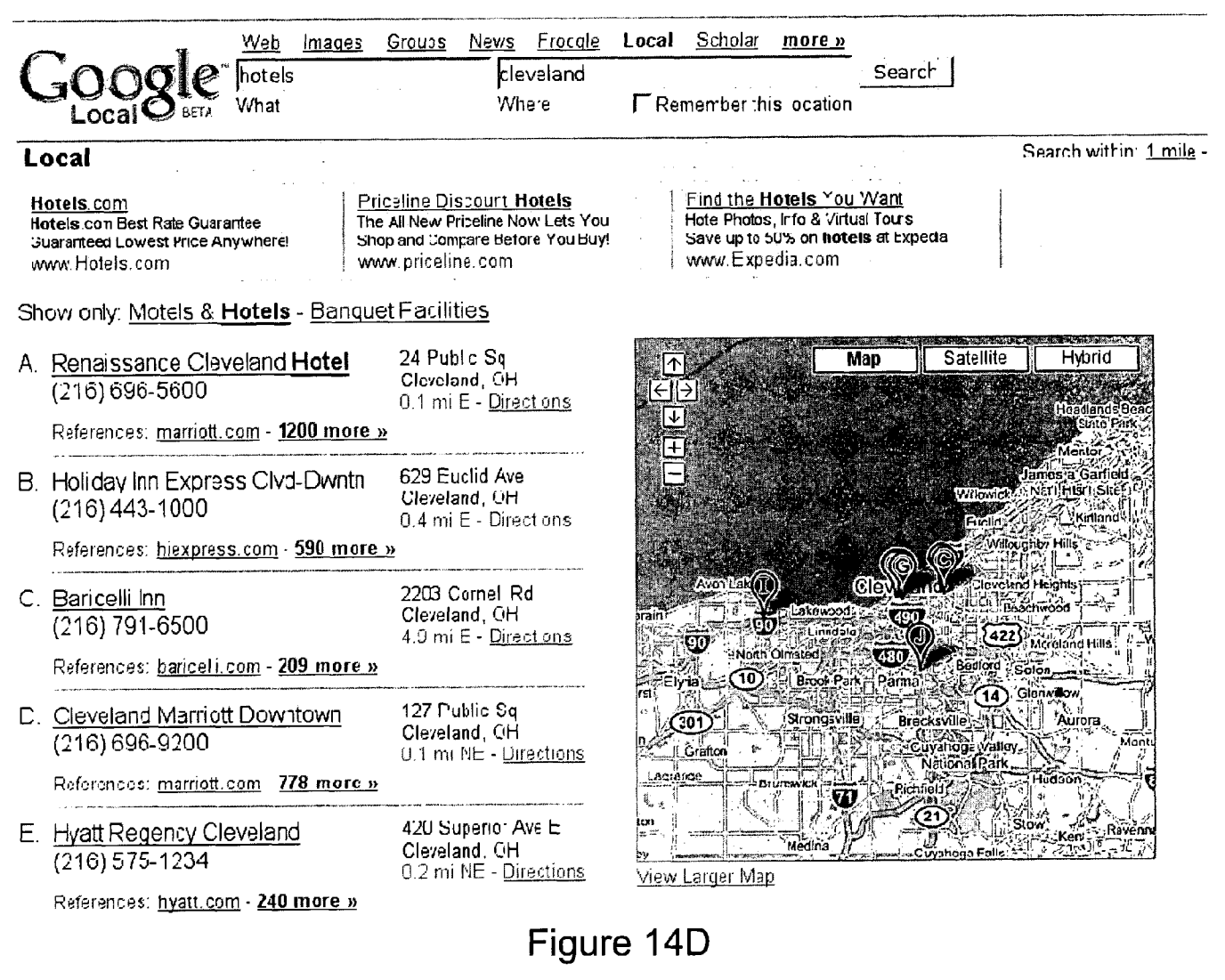

FIG. 14A is an exemplary screenshot of an itinerary message including information entity such as city name 1440 "Cleveland, Ohio" To the right of the message body are three hyperlinks 1410, 1420, and 1430. These links are generated by the information entity server after identifying the city name in the message body. Link 1410 directs the user to a separate window (FIG. 14B) if he or she wants to add the flight information to his or her personal calendar. Adding the flight information to a calendar can enable the user to receive a reminder of the trip, or to share this information with other people who have access rights to the user's calendar. The calendar entry may include fields 1450, 1452, 1454, 1456, 1458, at least some of which are filled with information extracted from the itinerary message (FIG. 14A), such as a title (1452), a location (1454), begin and end dates and/or times (1456), and a calendar entry description. Link 1420 directs to the user to a web page (FIG. 14C) including weather information for Cleveland, Ohio. Link 1430 directs the user to a web page (FIG. 14D) that includes hotel information for Cleveland, Ohio. As shown in FIGS. 14C and 14D, the two links 1420 and 1430 essentially correspond to two search queries for different types of content. The queries may be directed to the same or different search engines or websites.

Figure 15B:
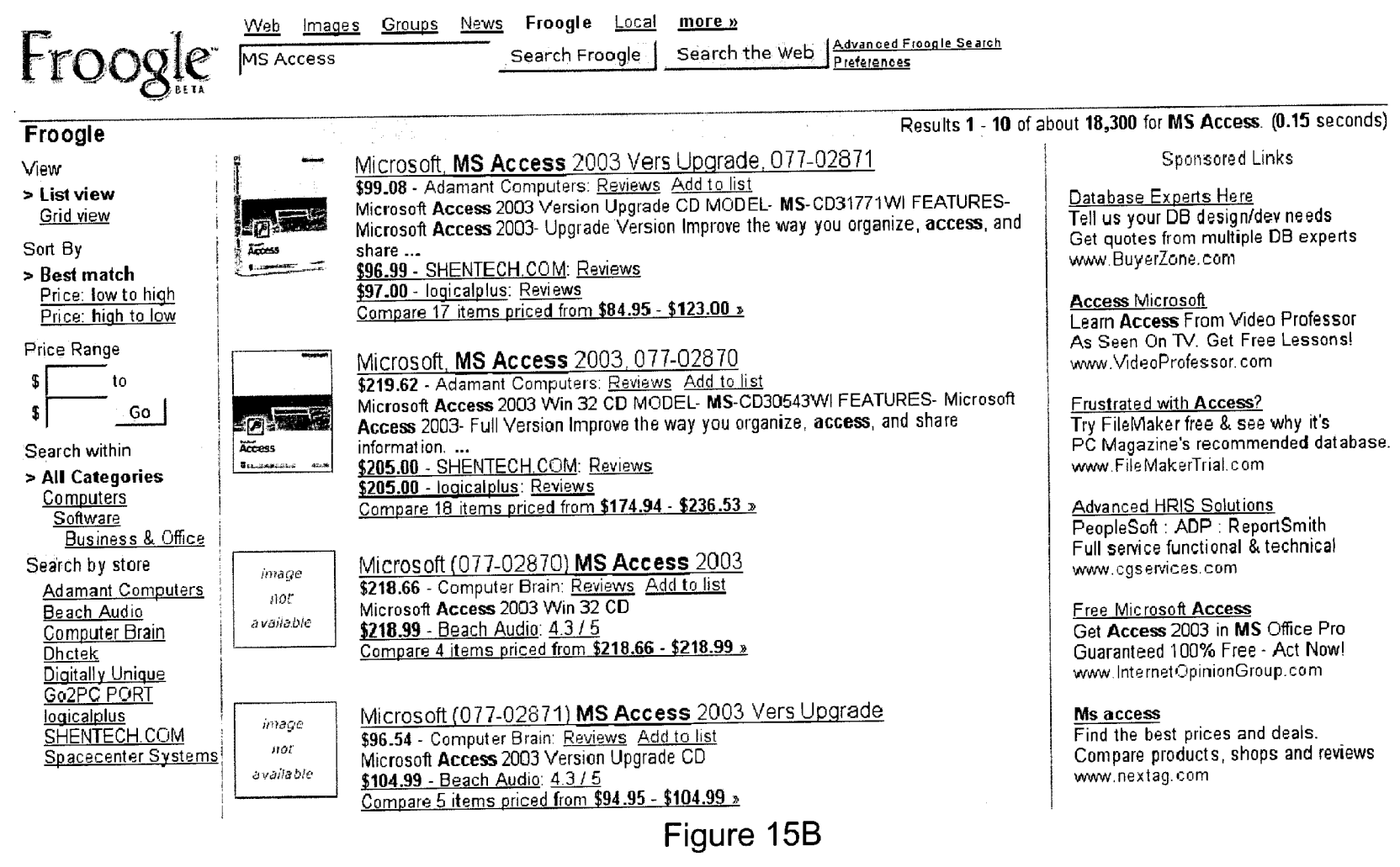
Figure 16:
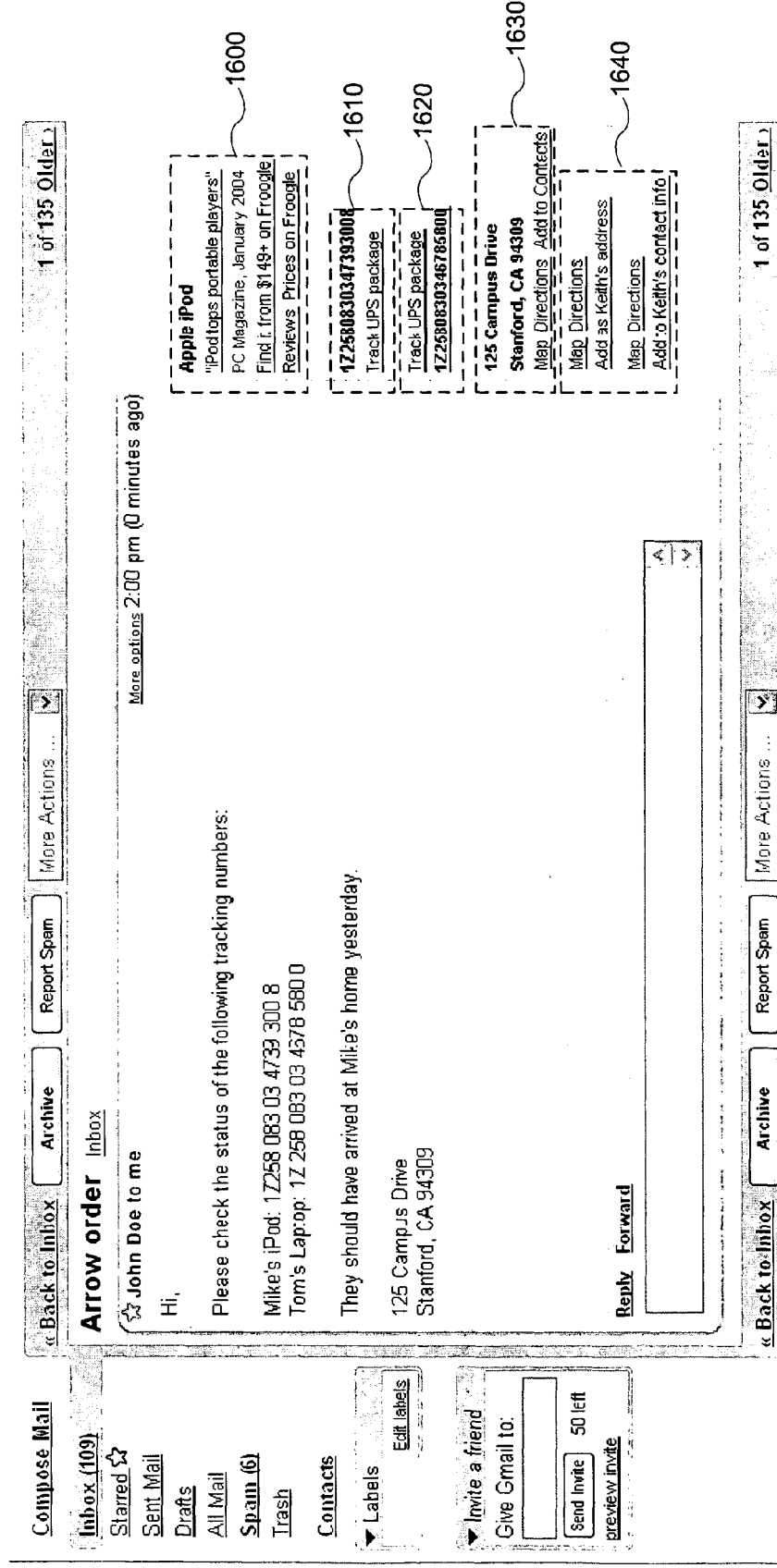
FIG. 16 is an exemplary screenshot of an email message including information entities like a product name, two package shipment tracking numbers and an address as well as links associated with the information entities in accordance with some embodiments of the present invention.

FIG. 15A is an exemplary screenshot of an email message including a software product name "MS Access". A link 1510 to a product search engine is displayed to the right of the message body. When a user clicks on the link, he or she will be directed to a separate window (FIG. 15B) listing relevant information about the product, such as prices, images, vendors. FIG. 16 is another exemplary screenshot of an email message including a number of information entities, including a product name, "iPod," two package shipment tracking numbers and an address. To the right of the message body, the displayed window includes advertisements 1600 related to the product name "iPod", links 1610, 1620 to the shipping status of the two packages and links 1630, 1640 to maps and driving directions associated with the address in the message body.

Figure 17:
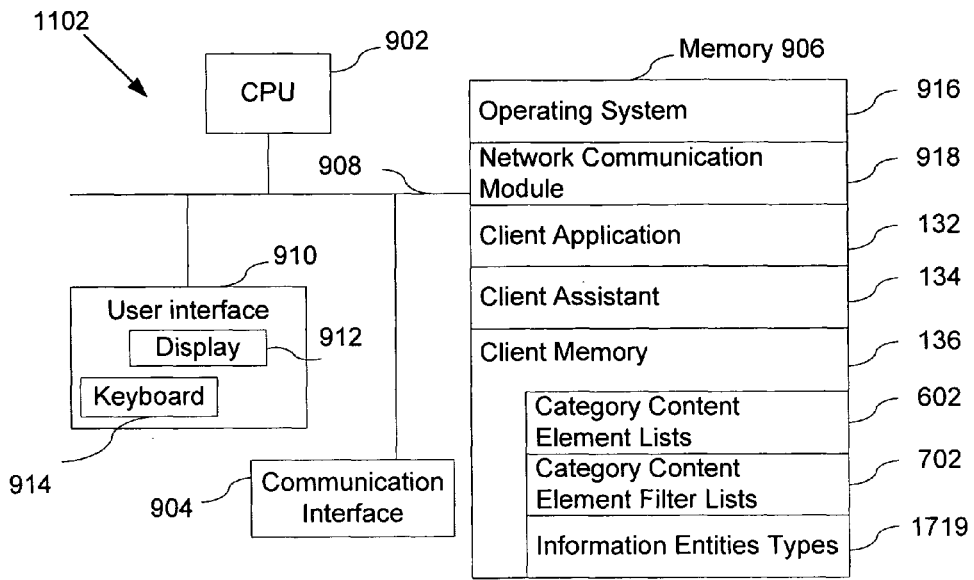
FIG. 17 is a block diagram of an exemplary client in accordance with some embodiments of the present invention.

FIG. 17 is a block diagram of an exemplary client 1102 in accordance with some embodiments of the invention. As mentioned above, the structure of client 1102 is very similar to that of client 102, shown in FIG. 9. Besides the components or elements discussed above in connection with FIG. 9, client memory 1136 may include information about the predefined information entity types 1719 associated with an email message.

Figure 18:
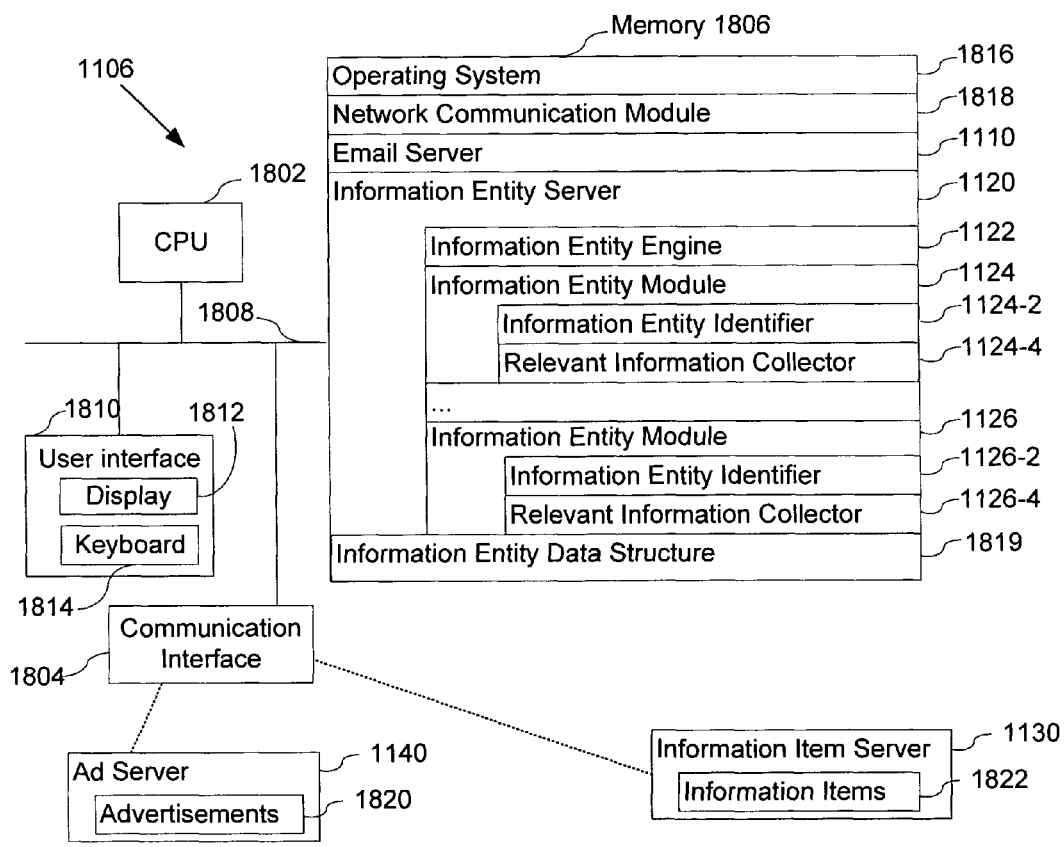
FIG. 18 is a block diagram of an exemplary information entity server in accordance with some embodiments of the present invention.

FIG. 18 is a block diagram of an exemplary information entity server 1106 in accordance with some embodiments of the invention. The information entity server 1106 typically includes one or more processing units (CPUs) 1802, one or more network or other communications interfaces 1804, memory 1806, and one or more communication buses 1808 for interconnecting these components. The information entity server 1106 optionally may include a user interface 1810 comprising a display device 1812 and a keyboard 1814. Memory 1806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 1806 may optionally include one or more storage devices remotely located from the CPU(s) 1802. In some embodiments, memory 1806 stores the following programs, modules and data structures, or a subset thereof:

- an operating system 1816 that includes procedures for handling various basic system services and for performing hardware dependent tasks;
- a network communication module 1818 that is used for connecting the information entity server 1106 to other computers via the one or more communication network interfaces 1804 and one or more communication networks, such as the Internet, other wide area networks, local area networks, metropolitan area networks, and so on;
- an email server 1110 for receiving requests from and serving requested messages to a requesting client 1102;
- an information entity server 1120 for receiving messages and information entity types from the email server 1110 and serving related information or links to the email server 1110; and
- information entity data structure 1819 that includes a list of information entities identified in a message and their related information.

In some embodiments, the information entity server 1106 includes the following elements, or a subset or superset of such elements: an information entity engine 1122 for responding to a variety of requests from the email server 1110 returning targeted information based on identified information entities and one or more information entity modules (1124, 1126) for identifying information entities in a message and collecting information related to the information entities.

The information entity server 1106 can be connected to ad server 1140 and/or information item server 1130 via the communication interface 1804. Ad server 1140 can contain one or more advertisements 1820. The ad server 1140 can receive input and return advertisements that can be relevant to the input. The information item server 1130 can include one or more information items 1822. Similar to the ad server 1140, the information server 1130 can receive input and return informational items that can be relevant to the input.

Each of the above identified elements in FIGS. 17 and 18 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 1706 or 1806 may store a subset of the modules and data structures identified above. Furthermore, memory 1706 or 1806 may store additional modules and data structures not described above.

Although FIGS. 17 and 18 show, respectively a client 1102 and an information entity server 1106, the figures are intended more as functional descriptions of the various features which may be present in a client and set of servers than as a structural schematic of the embodiments described herein. In practice, and as recognized by those of ordinary skill in the art, items shown separately could be combined and some items could be separated. For example, some items shown separately in FIG. 18 could be implemented on single servers and single items could be implemented by one or more servers. The actual number of servers used to implement an information entity server 1106 and how features are allocated among them will vary from one implementation to another, and may depend in part on the amount of data traffic that the system must handle during peak usage periods as well as during average usage periods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of serving an electronic document in response to a client request, comprising:
    on a server system having one or more processors that execute one or more programs stored in memory of the server system, responding to a request for an electronic document, the request received from a remotely located client, wherein the request is initiated by a user of the requesting client, the responding including:
        extracting from the requested electronic document at least one information entity identified as matching at least one predefined information entity type;
        generating one or more links associated with the at least one information entity; and
        serving the one or more links, information corresponding to the at least one information entity, and the electronic document to the requesting client, wherein the one or more links include a link containing a search query selected from a group consisting of a search query for a geographic map, a search query for driving directions, a search query for a weather forecast of a location, a search query for a stock price, and a search query for a movie schedule at a predefined movie theater.

2. The method of claim 1, further comprising:
    submitting a search query to a predefined information server, the query corresponding to the at least one information entity;
    obtaining from the predefined information server query results associated with the submitted search query; and
    serving the query results to the requesting client.

3. The method of claim 1, wherein the electronic document is a message selected from a group consisting of one or more email messages, SMS messages, transcribed voice messages, and any combination thereof.

4. The method of claim 1, wherein the extracted at least one information entity is an entity selected from a group consisting of a physical address, an email address, a phone number, an object identification number, a product name, a company name, a stock ticker symbol, a movie title, a book title, a calendar entry, an individual's name, a city name, a URL, predefined event information and flight information.

5. The method of claim 4, wherein the object identification number is a package shipment tracking number and the one or more links include a link containing a search query for a shipment status of a package identified by the package shipment tracking number.

6. A method of displaying an electronic document in response to a client request, comprising:
    on a client system having one or more processors that execute one or more programs stored in memory of the client system to perform the method, in response to a request for an electronic document initiated by a user of the client system:
        obtaining from a remotely located server system the electronic document and one or more links generated in response to the request, the one or more links corresponding to at least one information entity identified in the requested electronic document, and wherein the at least one information entity is identified as matching at least one predefined information entity type; and
        displaying at the client system the one or more links alongside the electronic document, wherein the one or more links include a link containing a search query selected from a group consisting of a search query for a geographic map, a search query for driving directions, and a search query for a weather forecast of a location, a search query for a stock price, and a search query for a movie schedule at a predefined movie theater.

7. The method of claim 6, wherein the electronic document is a message selected from a group consisting of one or more email messages, SMS messages, transcribed voice messages, and any combination thereof.

8. The method of claim 6, wherein the at least one information entity is an entity selected from a group consisting of a physical address, an email address, a phone number, an object identification number, a product name, a company name, a stock ticker symbol, a movie title, a book title, a calendar entry, an individual's name, a city name, a URL, predefined event information and flight information.

9. The method of claim 8, wherein the object identification number is a package shipment tracking number and the one or more links include a link containing a search query for a shipment status of a package identified by the package shipment tracking number.

10. The method of claim 6, wherein the one or more links include a link to a user's contact list.

11. The method of claim 6, wherein the one or more links include a link to a user's calendar.

12. A non-transitory computer readable storage medium storing one or more programs for execution by one or more processors of a computer system, the one or more programs comprising:
    instructions, for execution at a server system, for responding to a request for an electronic document, the request received from a remotely located client, wherein the request is initiated by a user of the requesting client, including:
        instructions for extracting from the requested electronic document at least one information entity identified as matching at least one predefined information entity type;
        instructions for generating one or more links associated with the at least one information entity; and
        instructions for serving the one or more links, information corresponding to the at least one information entity, and the electronic document to the requesting client, wherein the one or more links include a link containing a search query selected from a group consisting of a search query for a geographic map, a search query for driving directions, a search query for a weather forecast of a location, a search query for a stock price, and a search query for a movie schedule at a predefined movie theater.

13. A server system for serving an electronic document in response to a client request, comprising:
    one or more processors;
    memory storing one or more programs for execution by the one or more processors, the one or more programs including instructions which when executed by the one or more processors cause the server system to respond to a request for an electronic document, the request received from a remotely located client, wherein the request is initiated by a user of the requesting client, the instructions including:
  instructions for extracting from the requested electronic document at least one information entity identified as matching at least one predefined information entity type;
  instructions for generating one or more links associated with the at least one information entity; and
  instructions for serving the one or more links, information corresponding to the at least one information entity, and the electronic document to the requesting client, wherein the one or more links include a link containing a search query selected from a group consisting of a search query for a geographic map, a search query for driving directions, a search query for a weather forecast of a location, a search query for a stock price, and a search query for a movie schedule at a predefined movie theater.

14. The server system of claim 13, wherein the one or more programs further include instructions, which when executed by the one or more processors cause the server system to:
  submit a search query to a predefined information server, the query corresponding to the at least one information entity;
  obtain from the predefined information server query results associated with the submitted search query; and
  serve the query results to the requesting client.

15. The server system of claim 13, wherein the electronic document is a message selected from a group consisting of one or more email messages, SMS messages, transcribed voice messages, and any combination thereof.

16. The server system of claim 13, wherein the extracted at least one information entity is an entity selected from a group consisting of a physical address, an email address, a phone number, an object identification number, a product name, a company name, a stock ticker symbol, a movie title, a book title, a calendar entry, an individual's name, a city name, a URL, predefined event information and flight information.

17. The server system of claim 16, wherein the object identification number is a package shipment tracking number and the one or more links include a link containing a search query for a shipment status of a package identified by the package shipment tracking number.

18. The server system of claim 13, wherein:
  the at least one information entity is extracted by one or more information entity modules, each module corresponding to at least one predefined information entity type.

19. The server system of claim 18, wherein the at least one information entity is extracted by two or more information entity modules and wherein at least one of the information entity modules depends on information entities extracted by another one of the information entity modules.

20. The server system of claim 19, wherein the information entity modules are configured to sequentially execute in an order consistent with the dependencies of one or more of the modules.

21. The method of claim 1, the at least one information entity is extracted by one or more information entity modules, each module corresponding to at least one predefined information entity type.

22. The method of claim 21, wherein the at least one information entity is extracted by two or more information entity modules and wherein at least one of the information entity modules depends on information entities extracted by another one of the information entity modules.

23. The method of claim 22, wherein the information entity modules are configured to sequentially execute in an order consistent with the dependencies of one or more of the modules.

24. The non-transitory computer readable storage medium of claim 12, wherein the one or more programs further include instructions, which when executed by the one or more processors cause the server system to:
  submit a search query to a predefined information server, the query corresponding to the at least one information entity;
  obtain from the predefined information server query results associated with the submitted search query; and
  serve the query results to the requesting client.

25. The non-transitory computer readable storage medium of claim 12, wherein the electronic document is a message selected from a group consisting of one or more email messages, SMS messages, transcribed voice messages, and any combination thereof.

26. The non-transitory computer readable storage medium of claim 12, wherein the extracted at least one information entity is an entity selected from a group consisting of a physical address, an email address, a phone number, an object identification number, a product name, a company name, a stock ticker symbol, a movie title, a book title, a calendar entry, an individual's name, a city name, a URL, predefined event information and flight information.

27. The non-transitory computer readable storage medium of claim 26, wherein the object identification number is a package shipment tracking number and the one or more links include a link containing a search query for a shipment status of a package identified by the package shipment tracking number.

28. The non-transitory computer readable storage medium of claim 12, wherein:
  the at least one information entity is extracted by one or more information entity modules, each module corresponding to at least one predefined information entity type.

29. The non-transitory computer readable storage medium of claim 28, wherein the at least one information entity is extracted by two or more information entity modules and wherein at least one of the information entity modules depends on information entities extracted by another one of the information entity modules.

30. The non-transitory computer readable storage medium of claim 29, wherein the information entity modules are configured to sequentially execute in an order consistent with the dependencies of one or more of the modules.

* * * * *